United States Patent [19]
Hiraizumi

[11] Patent Number: 5,550,977
[45] Date of Patent: Aug. 27, 1996

[54] MULTI-MEDIA MAILING METHOD AND APPARATUS

[75] Inventor: Maki Hiraizumi, Kawasaki, Japan

[73] Assignee: Fujitsu Limited, Kanagawa, Japan

[21] Appl. No.: 63,928

[22] Filed: May 18, 1993

[30] Foreign Application Priority Data

May 18, 1992 [JP] Japan ..................... 4-124621

[51] Int. Cl.$^6$ .............................. G06F 13/14; G06F 13/38
[52] U.S. Cl. ................ 395/200.01; 364/940; 364/284.3
[58] Field of Search ............................. 395/200.01, 325, 395/800

[56] References Cited

U.S. PATENT DOCUMENTS

| | | | |
|---|---|---|---|
| 4,956,769 | 9/1990 | Smith | 364/200 |
| 5,093,918 | 3/1992 | Heyen | 395/725 |
| 5,220,657 | 6/1993 | Bly | 395/425 |
| 5,230,065 | 7/1993 | Curley | 395/200 |
| 5,251,315 | 10/1993 | Wang | 395/600 |

*Primary Examiner*—David Y. Eng

[57] ABSTRACT

A multi-media mailing method and system including a plurality of mailing centers in a network for handling facsimile, audio and text signals, wherein different mailing centers function independently of each other but hold information commonly while a utilizer can get similar mailing service from whichever center it accesses. When a temporary utilizer subscriber whose subscriber information is registered in a first mailing center accesses a second mailing center in which the subscriber information is not registered, the second mailing center transmits to any other mailing center, an inquiry whether or not the subscriber information of the temporary utilizer subscriber is registered. If the subscriber information is received from first mailing center in which the subscriber information of the temporary utilizer subscriber information is stored, the second mailing center temporarily stores the subscriber information to permit the access by the temporary utilizer subscriber by way of the second mailing center.

11 Claims, 17 Drawing Sheets

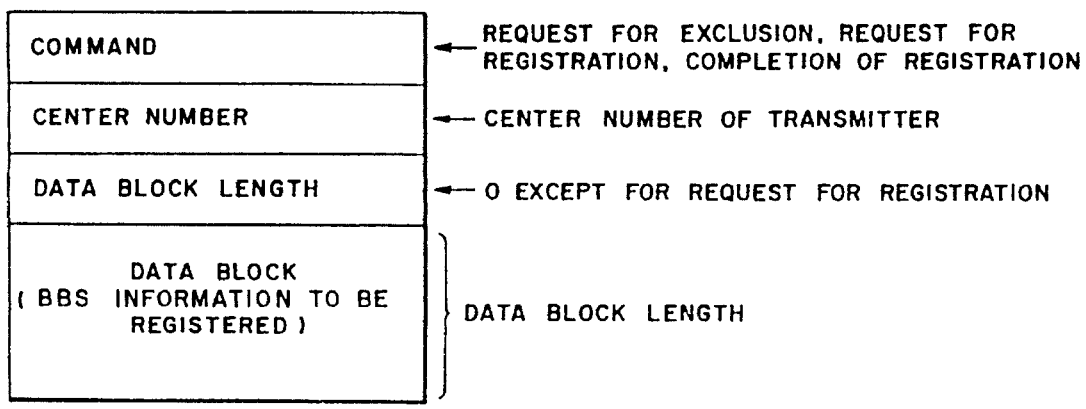

MULTI-MEDIA MAILING METHOD AND APPARATUS

BACKGROUND OF THE INVENTION

This invention relates to a multi-media mailing system which includes a plurality of mail centers in a network and handles signals such as facsimile signals, audio signals and text signals.

Conventional multi-media mailing systems adopt either the single-center configuration or the multi-center configuration. In a multi-media mailing system of the single-center configuration, as shown in FIG. 18, services to terminals 2 of a plurality of switching networks 3 are processed by a single mailing center 1.

Meanwhile, in a multi-media mailing system of the multi-center configuration, as shown in FIG. 19, services to terminals 2 of each of a plurality of switching networks 3 are processed by a mailing center 1 provided for each of the switching networks 3, and information is communicated between each two mailing centers 1 by way of a communication line for exclusive use. In other words, in a system of the multi-center configuration, one mailing center 1 is provided for each switching network 3 so as to disperse the load applied to each mailing center 1.

In a multi-media mailing system of the multi-center configuration, as an information management system by which same information can be obtained from whichever one of the centers information of, for example, a bulletin board is accessed, one of two types including a centralized management type and a decentralized management type is adopted.

A system of the centralized management type will be described first. A system of the centralized management type includes, as seen from the system including broken line representations in FIG. 19, a single management center 50 which obtains information from any of the mail centers 1 by accessing from it and manages information from all of the centers 1 in a centralized condition by itself.

In the system of the centralized management type having such management center 50, information obtained at each of the centers 1 is transmitted to the management center 50, in which the information is managed in a centralized condition. Then, when the management center 50 is accessed from any of the centers 1, particular information is supplied from the management center 50 to the accessing center 1.

On the other hand, in another system of the decentralized management type, as seen from the system which does not include the broken line representations in FIG. 19, information registered in any of the centers 1 is transmitted to any other center 1 so that it may be registered into each center 1.

In the system of the decentralized management type of the construction just described, since information is held commonly by all of the centers, even if one of the centers enters an inoperative condition, no influence is had on operation of any other center.

The conventional multi-media mailing systems of the constructions described above, however, have a subject to be solved, where they are of the single-center configuration, in that the load is concentrated upon the single mailing center, which deteriorates the processing capacitance of the mailing center since processing of all of the terminals 2 of the switching networks 3 is handled by the single mailing center.

Further, where the conventional multi-media mailing systems of the single center configuration are of the single-center configuration, they have another subject to be solved in that, since only one mailing center is involved, if the mailing center is put into an inoperative condition by some reason, then all of the terminals 2 of the networks are put into a condition wherein they do not accept any service.

On the other hand, even where the conventional multi-media mailing systems are of the multi-center configuration and of the centralized management type, they have a subject to be solved in that, if the management center is put into an inoperative condition by some reason, then even if the remaining centers have no trouble, the centers of the entire network are put into a condition wherein they cannot operate at all.

Further, where the conventional multi-media mailing systems are of the multi-center configuration and of the decentralized management type, the order of registration may not be identical between the centers due to a delay in transmission between the centers, and in this instance, the contents of the management tables of the centers may not coincide with each other. Accordingly, they have a subject to be solved in that processing of deletion and updating can be performed only in each of the centers itself.

The conventional multi-media mailing systems of the decentralized management type also have another subject to be solved in that, since subscriber information is different among different centers, a subscriber cannot access any center in which the subscriber is not registered.

SUMMARY OF THE INVENTION

It is an object of the present invention to provide a multi-media mailing method and apparatus of the multi-center configuration wherein different centers function independently of each other but hold information commonly while a utilizer can get similar mailing service from whichever area (center) it accesses.

In order to attain the object described above, according to an aspect of the present invention, there is provided a multi-media mailing method for a multi-media mailing system which includes a plurality of mailing centers in a network and handles signals such as facsimile signals, audio signals and text signals, wherein, when a temporary utilizer subscriber, whose subscriber information is registered in a first one of the mailing centers, accesses a second one of the mailing centers in which the subscriber information is not registered, the second mailing center delivers, to all or some of the remaining mailing centers other than the second mailing center, an inquiry whether or not the subscriber information of the temporary utilizer subscriber is registered, and then temporarily stores therein the subscriber information, when the subscriber information is received from the first mailing center in which the subscriber information of the temporary utilizer subscriber is registered, to permit the access by the temporary utilizer subscriber by the second mailing center.

According to another aspect of the present invention, there is provided a multi-media mailing apparatus which constitutes a mailing center, which comprises subscriber information registration means for registering subscriber information therein, temporary utilizer subscriber information registration means for registering therein subscriber information of a temporary utilizer subscriber whose subscriber information is registered in a second mailing center, communication means for delivering, when it is accessed by a temporary utilizer subscriber, to a mailing center or centers other than the mailing center of the multi-media mailing apparatus an inquiry whether or not subscriber information of the temporary utilizer subscriber is registered, and control means for temporarily storing, when the subscriber information of the temporary utilizer subscriber is received by the communication means from the second mailing center in which the subscriber information of the temporary utilizer subscriber is registered, the subscriber information into the temporary utilizer subscriber information registration means to permit the access by the temporary utilizer subscriber.

According to a further aspect of the present invention, there is provided a multi-media mailing method for a multi-media mailing system which includes a plurality of mailing centers in a network and handles signals such as facsimile signals, audio signals and text signals, wherein, when a subscriber makes a request for registration processing of particular information at a first one of the mailing centers, the first mailing center executes processing of registration of the particular information into storage means of the first mailing center, and delivers a request for registration processing of the particular information and delivers a request to inhibit processing by any other subscriber to a second one of the mailing centers other than the first mailing center, and then, in the second mailing center, processing of registration of the particular information into storage means of the second mailing center is performed, and then, when some other registration processing has been performed before the processing, contents of the storage means of the second mailing center are changed in accordance with a particular criterion, and finally, the inhibition of processing by any other subscriber is cancelled.

Preferably, when some other registration processing has been performed at a point of time when the second mailing center receives the request for registration processing of the particular information and the request to inhibit processing by any other subscriber, the second mailing center delivers to the first mailing center a notification that another registration processing has been performed, and then at the first mailing center, which receives the notification, it is determined in accordance with the particular criterion whether or not the stored contents in the second mailing center should be changed, whereafter, if it is determined that the stored contents should be changed, a notification of this determination is delivered to the second mailing center, and then the second mailing center, which receives the notification, changes the stored contents in accordance with the particular criterion.

Alternatively when the contents of the storage means in the second mailing center are changed in accordance with the particular criterion, the information is re-arranged in accordance with a particular priority order.

Also, when some other registration processing has been performed at a point of time when the second mailing center receives the request for registration processing of the particular information and the request to inhibit processing by any other subscriber, the second mailing center delivers to the first mailing center a notification that another registration processing has been performed, and then at the first mailing center, which receives the notification, it is determined in accordance with the particular criterion whether or not the stored contents in the second mailing center should be changed, whereafter, if it is determined that the stored contents should be changed, a notification of this is delivered to the second mailing center and then the first mailing center changes the stored contents thereof in accordance with the particular criterion, and then the second mailing center, which receives the notification to change, changes the stored contents in accordance with the particular criterion.

In this instance, when the contents of the storage means in the first and second mailing centers are changed in accordance with the particular criterion, the information is re-arranged in accordance with a predetermined priority order.

In either case, the particular information may be bulletin board service information.

Preferably, when the contents of the storage means in the second mailing center are changed in accordance with the particular criterion, the information is re-arranged in accordance with a particular priority order.

According to a still further aspect of the present invention, there is provided a multi-media mailing apparatus which constitutes a mailing center, which comprises storage means for storing information therein, registration processing means for receiving a request for registration of particular information by a subscriber and executing registration processing of the particular information into the storage means, communication means for transmitting, upon reception of a request for registration of particular information by a subscriber, a request for registration processing of the particular information and a request for inhibition of processing by any other subscriber to a second mailing center and for receiving from the second mailing center a notification that another registration processing has been performed already, determination means for determining, when a notification that another registration processing has been performed already is received from the second mailing center by way of the communication means, in accordance with a particular criterion whether or not stored contents of the storage means in the second mailing center should be changed, and changing notification means for transmitting, when it is determined by the determination means that the stored contents should be changed, a notification of the determination to the second mailing center by the communication means.

The particular information may be bulletin board service information.

The multi-media mailing apparatus may further comprise changing means for changing, when the determination means determines that the stored contents of the storage means in the second mailing center should be changed, the stored contents of the storage means in accordance with a particular criterion.

The storage means may include temporary storage means for temporarily storing particular information therein and for changing stored contents thereof under the control of the changing means, and main storage means for storing therein the stored contents of the temporary storage means transferred thereto from the temporary storage means.

The multi-media mailing apparatus may further comprise priority order information storage means for storing therein priority order information for use when the contents of the storage means are to be changed in accordance with the particular criterion.

According to a yet further aspect of the present invention, there is provided a multi-media mailing apparatus which constitutes a mailing center, which comprises storage means for storing particular information therein, processing/inhibition request reception means for receiving a request for registration processing of the particular information and a request for inhibition of processing by any other subscriber from a second mailing center, processing execution means for executing, upon reception of the request for processing and the request for inhibition by way of the processing/ inhibition request reception means, registration processing of the particular information into the storage means, determination means for determining whether or not another registration processing has been performed before the processing by the processing execution means, changing means for changing, when the determination means determines that another registration processing has been performed before the processing by the processing execution means, the contents of the storage means in accordance with a particular criterion, and inhibition cancellation means for canceling the inhibition of processing by any other subscriber after the processing by the processing execution means of the changing said contents by the changing means is completed.

The particular information may be bulletin board service information.

The changing means may include communication means for transmitting, when the determination means determines that another registration processing has been performed before the processing by the processing execution means, the determination to the second mailing center and for receiving a stored contents changing instruction from the second mailing center, and varying means for varying, when a stored contents changing instruction is received from the second mailing center by the communication means, the stored contents of the storage means in accordance with the particular criterion.

The storage means may include temporary storage means for temporarily storing particular information therein and for changing stored contents thereof under the control of the changing means, and main storage means for storing therein the stored contents of the temporary storage means transferred thereto from the temporary storage means.

The multi-media mailing apparatus may further comprise priority order information storage means for storing therein priority order information for use when the contents of the storage means are to be changed in accordance with the particular criterion.

According to a yet further aspect of the present invention, there is provided a multi-media mailing method for a multi-media mailing system which includes a plurality of mailing centers in a network and handles signals such as facsimile signals, audio signals and text signals, wherein, when a subscriber makes a request for deletion processing of particular information at a first one of the mailing centers, the first mailing center executes processing of deletion of the particular information from storage means thereof and delivers a request for deletion processing of the particular information and a request to inhibit processing by any other subscriber to a second one of the mailing centers other than the first mailing center, and then, after the deletion processing of the particular information is completed, the inhibition of processing by any other subscriber is cancelled.

The particular information may be bulletin board service information.

According to a yet further aspect of the present invention, there is provided a multi-media mailing apparatus which constitutes a mailing center, which comprises storage means for storing particular information therein, processing/inhibition request reception means for receiving a request for deletion of the particular information and a request for inhibition of processing by any other subscriber from a second mailing center, processing execution means for executing processing of deletion of the particular information from the storage means upon reception of the request for processing and the request for inhibition by the processing/inhibition request reception means, and inhibition cancellation means for canceling the inhibition of processing by any other subscriber after the processing by the processing execution means is completed.

The particular information may be bulletin board service information.

With the multi-media mailing system and method and the multi-media mailing apparatus for use with the system and method according to the present invention, in each mailing center, subscriber information is registered by the subscriber information registration means. Then, when a temporary utilizer subscriber whose subscriber information is registered in a first mailing center accesses a second mailing center in which the subscriber information is not registered, the following processing is performed.

First, the second mailing center makes an inquiry whether or not the subscriber information of the temporary utilizer subscriber is registered to all or some of the mail centers other than the second mailing center. In particular, when the temporary utilizer subscriber accesses the second mailing center, the second mailing center transmits, by way of the communication means to all or some of the mailing centers other than the second mailing center, an inquiry whether or not the subscriber information of the temporary utilizer subscriber is registered.

Thereafter, the second mailing center accessed by the temporary utilizer subscriber will receive, from the first mailing center in which the subscriber information of the temporary utilizer subscriber is registered, the subscriber information of the temporary utilizer subscriber by way of the communication means.

After the subscriber information of the temporary utilizer subscriber is received, the second mailing center stores, by means of the control means, the subscriber information temporarily into the temporary utilizer subscriber information storage means to permit the access by the temporary utilizer subscriber by the first mailing center.

On the other hand, if a subscriber makes a request for registration processing of particular information (for example, bulletin board service information) at a certain or the first mailing center, then the first mailing center executes processing of registration of the particular information into the storage means of itself.

Further, the first mailing center delivers a request for registration processing of the particular information and a request for inhibition of processing by any other subscriber to a second mailing center.

Consequently, the second mailing center executes processing of registration of the particular information into the storage means thereof. In this instance, if another registration processing has been performed before the processing, then the second mailing center changes the contents of the storage means thereof in accordance with the particular criterion and finally cancels the inhibition of processing by any other subscriber.

The processing when the second mailing center receives a request for registration processing and a request for inhibition is described in detail. In particular, if another registration processing has been performed already at the point of time when the second mailing center receives the requests, the second mailing center delivers to the first mailing center, from which the requests have been received, a notification that another registration processing has been performed already.

Then, at the first mailing center which receives the notification, it is determined in accordance with the particular criterion whether or not the stored contents of the second mailing center should be changed. If it is determined that the stored contents should be changed, then the first mailing center having received the notification now delivers a notification of the determination to the second mailing center. Upon reception of the notification, the second mailing center changes the stored contents thereof in accordance with the particular criterion.

Or, when it is determined that the stored contents should be changed, the first mailing center having received the notification now delivers a notification of the determination to the second mailing center and changes the stored contents thereof in accordance with the particular criterion.

Then, also the second mailing center changes the stored contents thereof in accordance with the particular criterion.

It is to be noted that, when the contents of the storage means in any of the mailing centers are to be changed in accordance with the particular criterion, the information is re-arranged in accordance with a predetermined priority order.

Further, in the multi-media mailing apparatus of the present invention, when it receives a request for registration of particular information by a subscriber, registration processing of the particular information into the storage means is executed by the registration processing means so that the information is stored into the storage means.

Meanwhile, when a request for registration of particular information by a subscriber is received, a request for registration processing of the particular information and a request for inhibition of processing by any other subscriber are transmitted to another or second mailing center by the communication means. Then, if a notification that another registration processing has been performed already is transmitted from the second mailing center to the first mailing center, the notification is received by the communication means.

Thereafter, when the determination means receives the notification by the communication means, it determines in accordance with the particular criterion whether or not the stored contents in the first mailing center itself should be changed.

Then, if the determination means determines that the stored contents should be changed, a notification of the determination is delivered to the second mailing center by the communication means.

It is to be noted that, in this instance, the contents of the storage means is changed by the changing means in accordance with the particular criterion, in short, with priority order information of the priority order information storage means.

In the meantime, when registration processing of the registration processing means is executed, particular information is temporarily stored into the temporary storage means of the storage means. Thereafter, if changing processing is performed by the changing means, then after the stored contents of the temporary storage means are changed, the stored contents of the temporary storage means are transferred to and stored into the main storage means.

Further, in the multi-media mailing apparatus of the present invention, when a request for registration processing of particular information and a request for inhibition of processing by any other subscriber are received from a second mailing center, they are received by the processing/inhibition request reception means.

The request for processing and the request for inhibition received by the processing/inhibition request reception means are transmitted to the processing execution means, by which registration processing of the particular information into the storage means is thereafter executed.

Then, the determination means determines whether or not another registration processing has been performed before the processing by the processing execution means. If the determination means determines that another registration processing has been performed before the processing by the processing execution means, then the contents of the storage means are changed in accordance with the particular criterion by the changing means.

Then, after the processing by the processing execution means or the changing processing by the changing means is completed, the inhibition of processing by any other subscriber is canceled by the inhibition cancellation means.

It is to be noted that, if the determination means determines that another registration processing has been performed before the processing, then the changing means delivers a notification of the determination to the second mailing center. Meanwhile, if a stored contents changing instruction is received from the second mailing center by way of the communication means, the changing means delivers the instruction to the varying means therein, and the varying means receiving the instruction changes the contents of the storage means in accordance with the particular criterion in response to the instruction.

It is to be noted that, when the contents of the storage means are to be changed by the changing means, they are changed in accordance with the particular criterion, in short, with the priority order information of the priority order information storage means.

Further, processing similar to that performed in a mailing center when a request for registration processing by a subscriber is received as described above is performed with the storage means.

Further, in the multi-media mailing system and method, if a request for deletion processing of particular information (for example, bulletin board service information) is made at a certain or the first mailing center by a subscriber, then the first mailing center executes processing of deletion of the particular information from the storage means thereof.

In this instance, the first mailing center delivers a request for deletion processing of the particular information and a request for inhibition of processing by any other subscriber to another or second mailing center.

Consequently, at the second mailing center, the request for deletion processing and the request for inhibition are received by the processing/inhibition request reception means, and then, the following processing is performed.

First, the request for deletion processing and the request for inhibition are transmitted from the processing/inhibition request reception means to the processing execution means. Then, upon reception of the requests, the processing execution means executes processing of deletion of the particular information from the temporary storage means of the storage means.

Thereafter, when the deletion processing of the particular information is completed, the inhibition of processing by any other subscriber is cancelled by the inhibition cancellation means.

In this manner, according to the present invention, while the multi-media mailing system and method have the multi-center configuration, quite identical bulletin board service information can be held commonly by all of the centers in the network. In other words, the multi-media mailing system and method are advantageous in that a utilizer can get similar mailing service from whichever area (center) the utilizer accesses.

Consequently, the utilizer does not need to be aware that the centers are independent of each other, but can have an idea that each piece of information is shared by the entire system. Accordingly, there is an advantage that the system can be utilized with a simple operation.

Further, since the centers can function independently of each other while quite same bulletin board service information is shared by the multi-media mailing system of the multi-center configuration, there is an advantage that only the advantages of the centralized management and the decentralized management can be utilized in that, even if one of the centers of the system enters an inoperative condition due to, for example, a failure, the system can operate with the remaining centers.

Further objects, features and advantages of the present invention will become apparent from the following detailed description when read in conjunction with the accompanying drawings in which like parts or elements are denoted by like reference characters.

BRIEF DESCRIPTION OF THE DRAWINGS

FIG. 8 is a diagrammatic view showing details of a data file produced by a bulletin board center linking section of the multi-media mailing apparatus of FIG. 2;

FIG. 9 is a diagrammatic view showing details of a format of a priority order storage section of the multi-media mailing apparatus of FIG. 2;

DESCRIPTION OF THE PREFERRED EMBODIMENT

Figure 1:
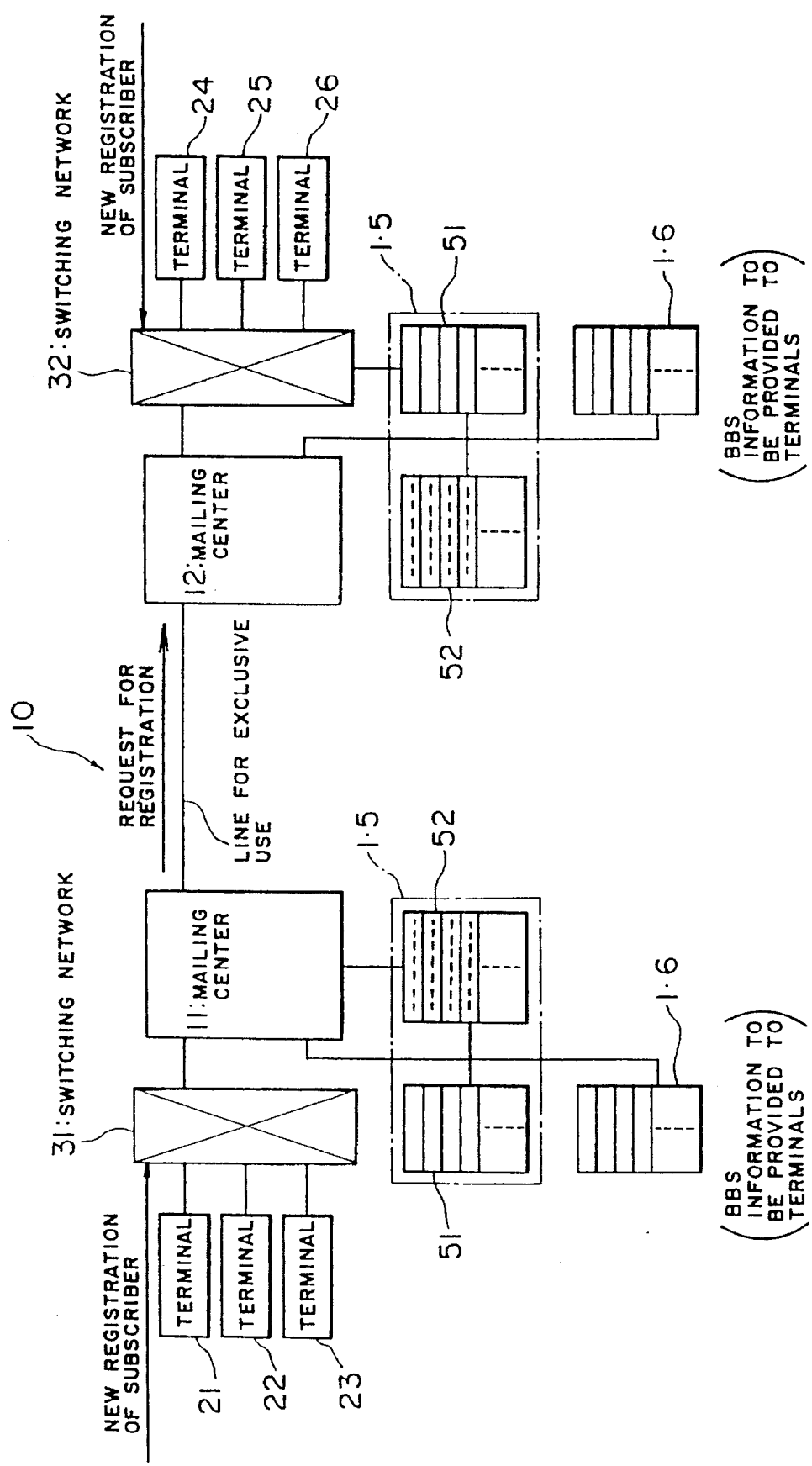
FIG. 1 is a block diagram showing a multi-media mailing system according to a preferred embodiment of the present invention.

Referring first to FIG. 1, there is shown a multi-media mailing system according to a preferred embodiment of the present invention. The multi-media mailing system shown is generally denoted at 10 and constructed as a system which handles signals such as facsimile signals, audio signals and text signals.

The multi-media mailing system 10 includes, for example, a pair of mailing centers 11 and 12 at a pair of stations in a system network. The mailing centers 11 and 12 include terminals 21 to 23 and 24 to 26 with a switching networks 31 and 32 interposed therebetween, respectively.

Figure 2:
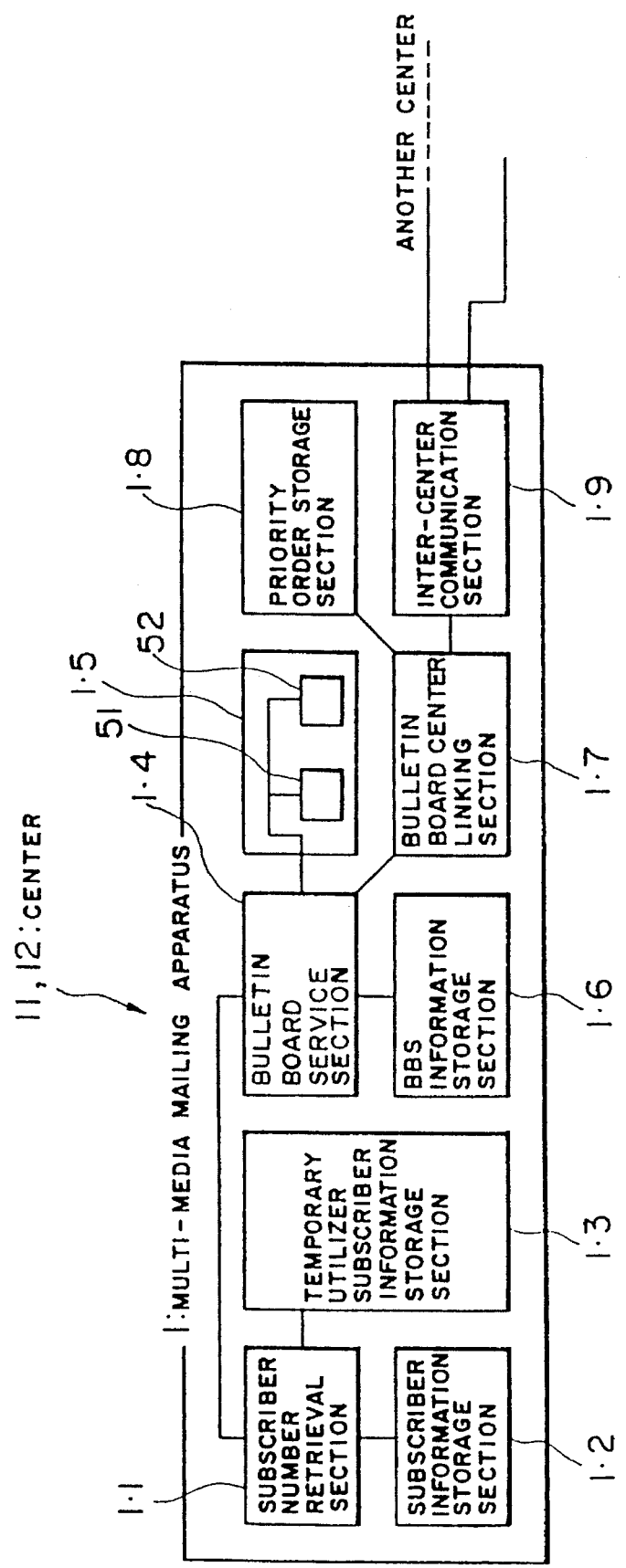
FIG. 2 is a block diagram showing a multi-media mailing apparatus of the multi-media mailing system of FIG. 1.

Each of the mailing centers 11 and 12 is constituted from such a multi-media mailing apparatus 1 as shown in FIG. 2. Referring now to FIG. 2, the multi-media mailing apparatus 1 shown includes a subscriber number retrieval section 1.1, a subscriber information storage section 1.2, a temporary utilizer subscriber information storage section 1.3, a bulletin board service section 1.4, a register table 1.5, a bulletin board service information storage section 1.6, a bulletin board center linking section 1.7, a priority order storage section 1.8 and an inter-center communication section 1.9.

Figure 3:
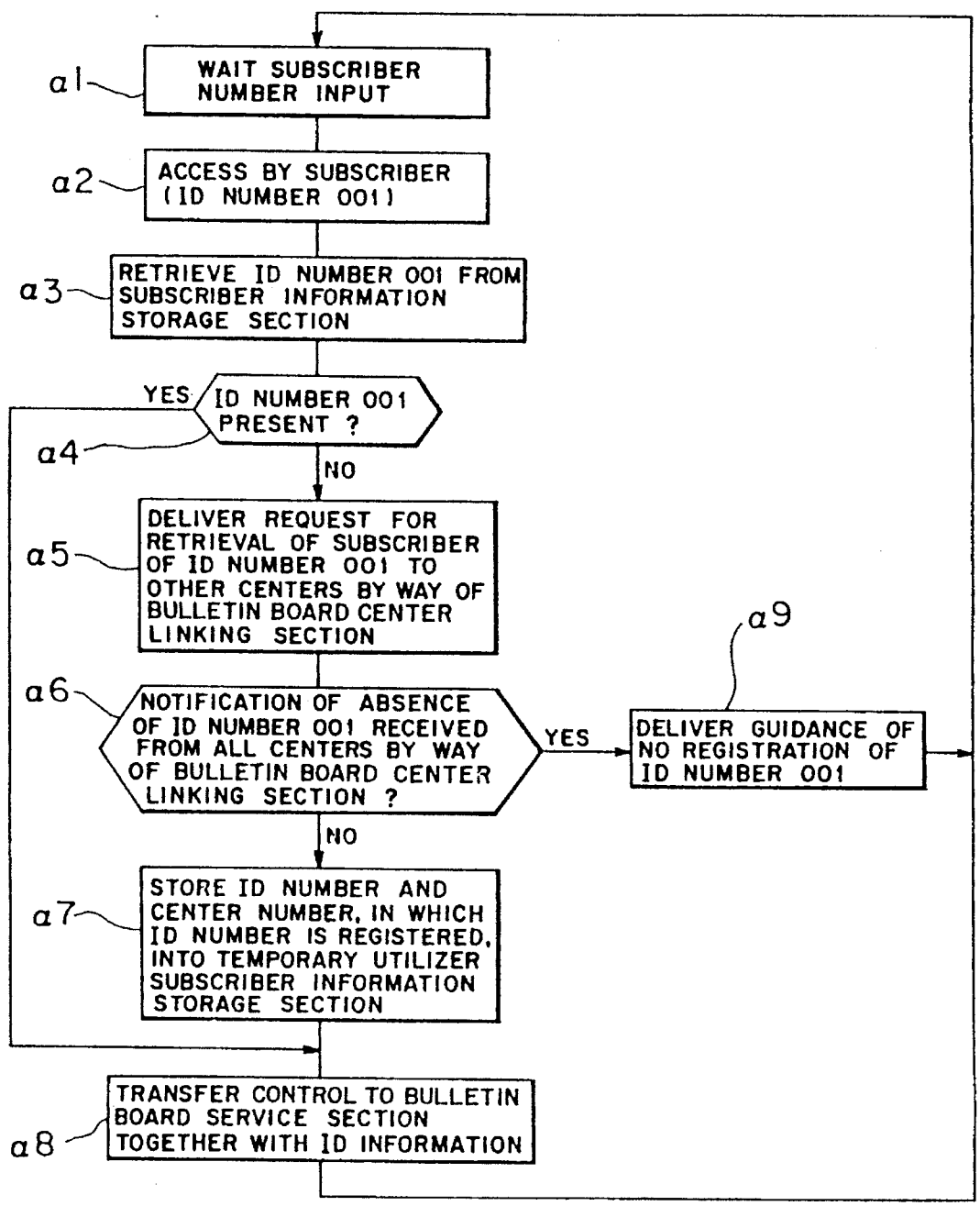
FIG. 3 is a flow chart illustrating operation of a subscriber number retrieval section of the multi-media mailing apparatus of FIG. 2.

The subscriber number retrieval section 1.1 retrieves information stored in the subscriber information storage section 1.2 and the temporary utilizer subscriber information storage section 1.3 such as, for example, subscriber registration information (BBS), and particularly has such functions as illustrated by the processing flow chart of FIG. 3.

Referring to FIG. 3, if the subscriber number retrieval section 1.1 is accessed from a subscriber (ID number 001) while it is in a subscriber number input waiting condition (steps α1 and α2), then it accesses the subscriber information storage section 1.2 to retrieve the ID number 001 of the subscriber (step α3).

Then, if the retrieval of the ID number 001 of the subscriber who has accessed the mailing center to which the subscriber number retrieval section 1.1 belongs reveals that the ID number 001 is registered in the subscriber information storage section 1.2 (YES at step α4), the subscriber number retrieval section 1.1 outputs the ID number 001 to the bulletin board service section 1.4 and transfers the control to the bulletin board service section 1.4 (step α8).

On the contrary, if the retrieval described above reveals that the ID number 001 is not registered in the subscriber information storage section 1.2 (NO at step α4), the subscriber number retrieval section 1.1 outputs, to the bulletin board center linking section 1.7, a notification to deliver a request for retrieval of subscriber registration information of the subscriber of the ID number 001 to all mailing centers in which the subscriber may possibly be registered (step α5).

Thereafter, if the subscriber number retrieval section 1.1 receives, from the bulletin board center linking section 1.7, the notification that it has received, from all of the mailing centers, the notification that the subscriber of the ID number 001 is not registered in the mailing center (YES at step α6), the subscriber number retrieval section 1.1 executes processing for rejection of log-in to the terminal operated by the subscriber of the ID number 001 and instructs the bulletin board service section 1.4 to issue a guidance that the subscriber is not registered in the present system (step α9).

On the other hand, if the subscriber number retrieval section 1.1 receives, from the bulletin board center linking section 1.7, the notification that it has received, from a particular mailing center, the notification that the subscriber of the ID number 001 is registered in the particular center (NO at step α6), then the subscriber number retrieval section 1.1 registers the subscriber information of the subscriber of the ID number 001 into the temporary utilizer subscriber information storage section 1.3 (step α7) so as to allow temporary log-in of the subscriber. It is to be noted that the subscriber information of the subscriber of the ID number 001 here is the ID number 001 and the identification number of the mailing center in which the subscriber is registered. Thereafter, the subscriber number retrieval section 1.1 transfers the control to the bulletin board service section 1.4 together with the ID number 001, whereafter it returns to its original input waiting condition (step α8).

The subscriber number retrieval section 1.1 is constructed so as to execute such processing as described above.

Referring back to FIG. 2, the subscriber information storage section 1.2 is used to store therein subscriber registration Information (identification information) of subscribers subscribed to the mailing center to which the subscriber information storage section 1.2 belongs. Meanwhile, the temporary utilizer subscriber information storage section 1.3 is used to store therein subscriber information of a temporary utilizer subscriber or subscribers whose subscriber information is registered in any other mailing center of the multi-media mailing system.

Figure 4:
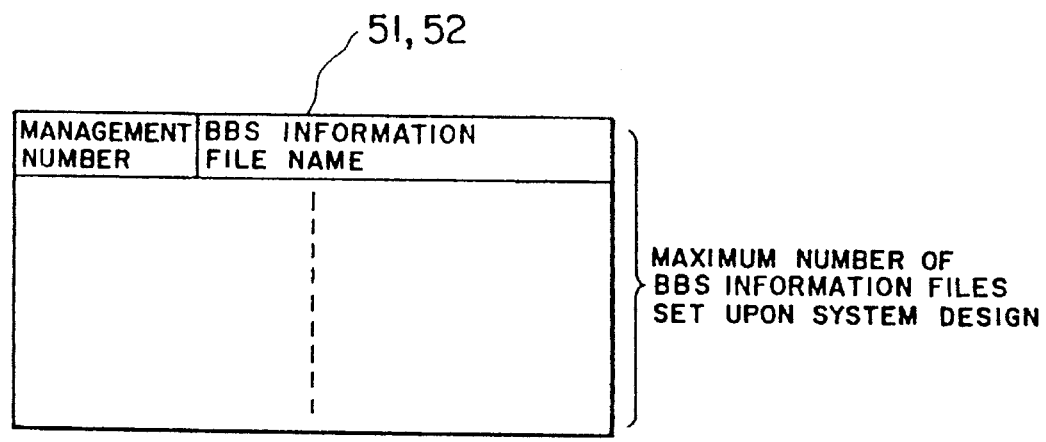
FIG. 4 is a diagrammatic view showing details of a register table of the multi-media mailing apparatus of FIG. 2.

Referring also to FIG. 4, the register table 1.5 includes a temporary storage portion 51 and a main storage portion 52 each for registering bulletin board service information file names and management numbers of them as bulletin board service information therein. The temporary storage portion 51 temporarily stores such information as just described therein, and the stored contents thereof are re-arranged by the bulletin board service section 1.4. Meanwhile, the main storage portion 52 receives and stores therein the stored contents of the temporary storage portion 51 which have been re-arranged by the bulletin board service section 1.4.

Referring back to FIG. 2, the bulletin board service information storage section 1.6 is used to store as bulletin board service information therein information corresponding to the file names in the register table 1.5, that is, information to be provided to a utilizer.

Figure 5:
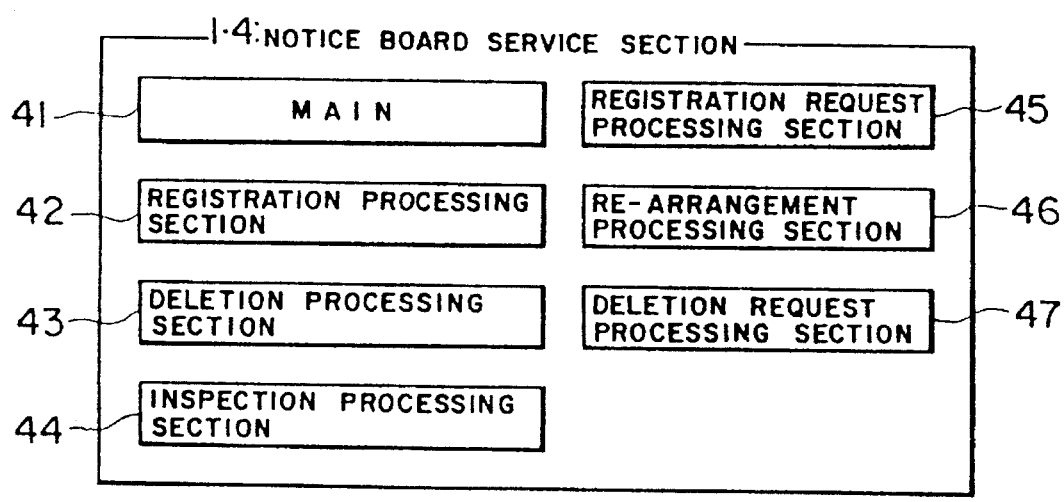
FIG. 5 is a block diagram showing a bulletin board service section of the multi-media mailing apparatus of FIG. 2.

The bulletin board service section 1.4 executes various processes for providing service of bulletin board service information requested by a subscriber. To this end, the bulletin board service section 1.4 includes, as shown in FIG. 5, a main control section 41, a registration processing section 42, a deletion processing section 43, an inspection processing section 44, a registration request processing section 45, a re-arrangement processing section 46 and a deletion request processing section 47.

The registration processing section 42 registers requested information; the deletion processing section 43 deletes requested information; the inspection processing section 44 executes inspection processing of instructed bulletin board service information: the registration request processing section 45 activates, when it receives a request for registration of predetermined information from any other mailing center, the registration processing section 42 in accordance with the request; the deletion request processing section 47 activates, when it receives a request for deletion of predetermined information from any other mailing center, the deletion processing section 43 in accordance with the request; and the re-arrangement processing section 46 re-arranges the contents of the temporary storage portion 51 of the register table 1.5 in accordance with a predetermined criterion indicated by a priority order recorded in the priority order storage section 1.8.

The main control section 41 executes suitable control in response to a situation then and controls the processing sections 42 to 47 described above in accordance with a preset method. More particularly, the main control section 41 executes such control as provides the following functions to the bulletin board service section 1.4.

In particular, when the control is transferred and then a predetermined instruction is transmitted from the subscriber number retrieval section 1.1 to the bulletin board service section 1.4, the bulletin board service section 1.4 delivers, to a terminal used by a subscriber whose log-in has been rejected, a guidance that the subscriber is not registered in the system.

Figure 6:
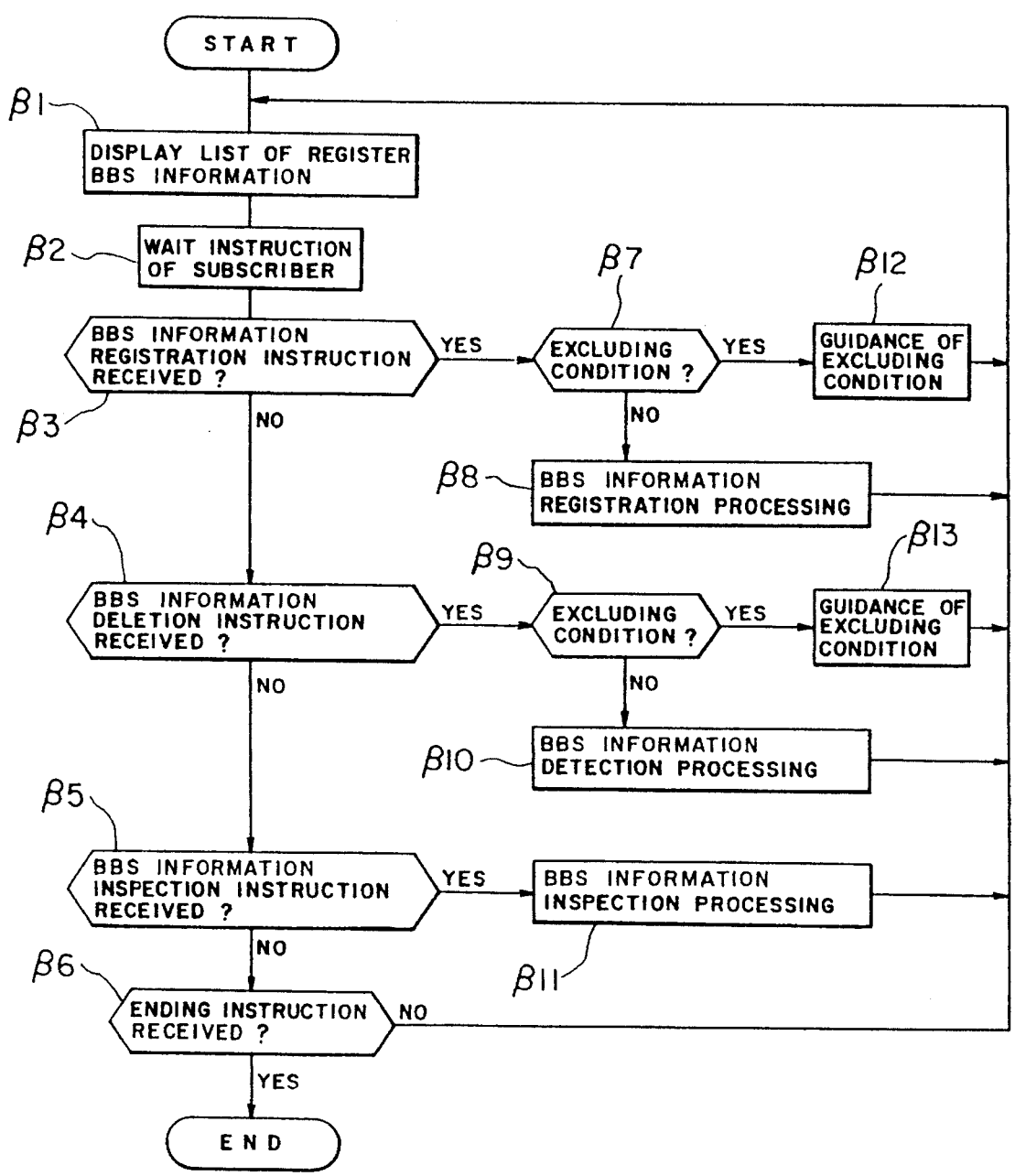
FIGS. 6 and 7 are flow charts illustrating operation of the bulletin board service section of FIG. 5.

Further, when the control is transferred from the subscriber number retrieval section 1.1 to the bulletin board service section 1.4 and the notification that log-in of a certain subscriber is permitted is transmitted from the subscriber number retrieval section 1.1 to the bulletin board service section 1.4, the bulletin board service section 1.4 executes such processing as illustrated by the processing flow chart of FIG. 6.

Referring to FIG. 6, the bulletin board service section 1.4 first displays, upon reception of the notification described above, a list of management numbers and bulletin board service information file names of the main storage portion 52 of the register table 1.5 in the bulletin board of the terminal which is used by the subscriber arid whose log-in has been permitted (step β1), and then waits an instruction from the subscriber (step β2).

Then, when the bulletin board service section 1.4 receives, as an instruction from the subscriber, from the bulletin board center linking section 1.7, a notification to register particular bulletin board service information into the mailing center of the subscriber (step β3), the bulletin board service section 1.4 checks to determine whether or not it is in an excluding or protected condition wherein it is protected against or excludes acceptance of registration and deletion processing into and from itself as a result of a request for inhibition (step β7).

If the bulletin board service section 1.4 is in its excluding or protected condition (YES at step β7), then it delivers to the terminal used by the subscriber an instruction to deliver a guidance of such excluding condition (step β12). It is to be noted, however, that, unless the subscriber having requested the registration of bulletin board service information is not registered as a subscriber in the mailing center to which the bulletin board service section 1.4 belongs, even if the bulletin board service section 1.4 is in its excluding condition, the excluding processing is not performed. In other words, when an access is received from any other mailing center, the excluding operation is not performed (NO at step β7).

On the other hand, when the bulletin board service section 1.4 is in the excluding condition (NO at step β7), it delivers, to all the other mailing centers by way of the bulletin board center linking section 1.7 and the inter-center communication section 1.9, the particular bulletin board service information and a notification to register the information as well as a request to inhibit registration and deletion processing into and from the bulletin board service information by any other subscriber.

Further, the bulletin board service section 1.4 registers the particular bulletin board service information requested by the subscriber into the temporary storage portion 51 of the register table 1.5 and the bulletin board service information storage section 1.6 (step β8). The bulletin board service section 1.4 may display a list of the register bulletin board on the terminal of the subscriber.

On the other hand, if the bulletin board service section 1.4 receives as an instruction of the subscriber from the bulletin board center linking section 1.7 a notification to delete certain bulletin board service information of the mailing center from the bulletin board service section 1.4 (step β4), the bulletin board service section 1.4 checks to determine whether or not it is in its excluding condition wherein it is protected against or excludes acceptance of registration and deletion processing into and from itself as a result of a request for inhibition (step β9).

If the bulletin board service section 1.4 is in the excluding condition (YES at step β9), then it delivers to the terminal used by the subscriber an instruction to deliver a guidance of such excluding condition (step β13). It is to be noted, however, that, unless the subscriber having requested the deletion of bulletin board service information is registered as a subscriber in the mailing center to which the bulletin board service section 1.4 belongs, even if the bulletin board service section 1.4 is in its excluding condition, the excluding processing is not performed. In other words, when an access is received from any other mailing center, the excluding operation is not performed (NO at step β9).

On the other hand, when the bulletin board service section 1.4 is not in its excluding condition (NO at step β9), it delivers, to all the other mailing centers by way of the bulletin board center linking section 1.7 and the inter-center communication section 1.9, the particular bulletin board service information and a notification to delete the information as well as a request to inhibit registration and deletion processing into and from the bulletin board service information by any other subscriber.

Further, the bulletin board service section 1.4 deletes the particular bulletin board service information requested by the subscriber from the temporary storage portion 51 of the register table 1.5 and the bulletin board service information storage section 1.6 (step β10). The bulletin board service section 1.4 may thereafter display a list of the register bulletin board on the terminal of the subscriber.

Furthermore, if the bulletin board service section 1.4 receives as an instruction of the subscriber from the bulletin board center linking section 1.7 a notification that inspection processing of bulletin board service information has been selected (YES at step β5), then it executes inspection processing of bulletin board service information thus indicated (step β11).

Figure 7:
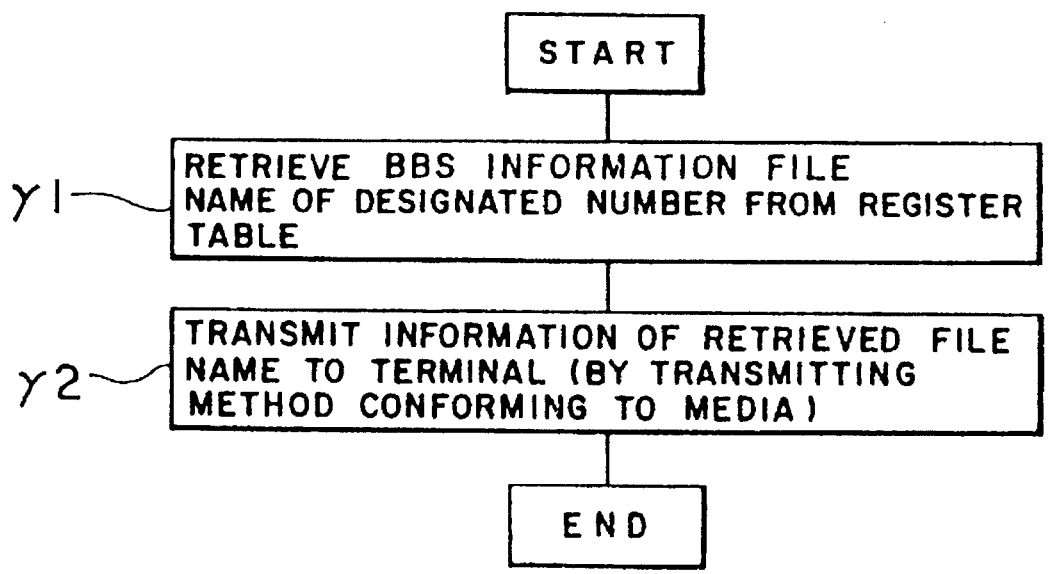

Here, the inspection processing of bulletin board service information proceeds in such a manner as illustrated in the processing flow chart of FIG. 7. Referring to FIG. 7, when the bulletin board service section 1.4 receives, from the bulletin board center linking section 1.7, a file name of bulletin board service information indicated as a designation number by the subscriber, it retrieves the file name indicated by the information from the main storage portion 52 of the register table 1.5 (step γ1).

Then, when the file name has been found out successfully, the bulletin board service section 1.4 fetches information of the file name from the bulletin board service Information storage section 1.6 and transmits the information by way of the bulletin board center linking section 1.7 and the inter-center communicating section 1.9 to the terminal used by the subscriber so as to cause the information to be displayed on the bulletin board of the terminal (step γ2).

If the bulletin board service section 1.4 receives, as a notification of the subscriber from the bulletin board center linking section 1.7, a notification that inspection of the information of the file name has been completed, then it may cause the terminal of the subscriber to display a list of the register bulletin board thereon.

It is to be noted that the bulletin board service information registration processing at step β8 and the bulletin board service information deletion processing at step β10 will be hereinafter described in detail.

By the way, if the bulletin board service section 1.4 receives an instruction (step β6) without receiving an instruction of registration of bulletin board service information, deletion of bulletin board service information or inspection processing of bulletin board service information (NO at step β3, No at step β4 or NO at step β5 in FIG. 6), then it ends processing for the subscriber.

Furthermore, if the bulletin board service section 1.4 receives a request for bulletin board service information registration or deletion processing and another request for exclusion from any other mailing center, then it executes registration or deletion processing of the information as described hereinabove with reference to FIG. 6 and then excludes a request for registration or deletion of the bulletin board service information from any subscriber of the mailing center to which the bulletin board service section 1.4 belongs.

On the other hand, if the bulletin board service section 1.4 receives a request for registration or deletion processing of particular bulletin board service information from a subscriber of the mailing center to which the bulletin board service section 1.4 belongs, then if the mailing center is not in its excluding condition, then the bulletin board service section 1.4 executes registration or deletion processing of the information and delivers a notification of the bulletin board service information, a request for registration or deletion of the information and a request for exclusion to all of the other mailing centers.

Further, the bulletin board service section 1.4 judges whether or not any other registration or deletion processing than the registration or deletion processing of the particular bulletin board service information described above has been performed after starting of the excluding operation.

Furthermore, although the bulletin board service section 1.4 executes, upon reception of a request for registration or deletion processing, such requested processing, if any other registration or deletion processing than the processing just described has been performed, then the bulletin board service section 1.4 re-arranges contents of the temporary storage portion 51 of the register table 1.5 in accordance with a predetermined criterion indicated by the priority order recorded in the priority order storage section 1.8.

In addition, the bulletin board service section 1.4 cancels, after it has changed the contents of the temporary storage portion 51 of the register table 1.5 in accordance with the predetermined criterion, its excluding condition of registration and deletion processing by any other subscriber.

Referring back to FIG. 2, the bulletin board center linking section 1.7 provides an association between processing of the multi-media mailing apparatus 1 and processing of any other multi-media mailing apparatus 1 using information of any multi-media mailing apparatus 1 transmitted thereto by way of the inter-center communicating section 1.9.

To this end, the bulletin board center linking section 1.7 produces such a data file as illustrated in in FIG. 8 when it receives a request for exclusion (inhibition), a request for registration, a request for deletion or a notification of completion of registration or deletion from the bulletin board service section 1.4, and transmits the thus produced data file to the address of the mailing center of the destination using the function of the inter-center communication section 1.9.

The inter-center communication section 1.9 performs communications between different multi-media mailing apparatus 1 and executes processing for the communications using the TCP/IP procedure for the transport layer and the network layer, X.25 for the data link layer and X.21 for the physical layer.

It is to be noted that, when the inter-center communication section 1.9 employs a communication procedure hierarchized in accordance with the OSI model, it need not necessarily employ the communication procedure described above, but may employ some other communication procedure.

The priority order storage section 1.8 is provided to change contents of the temporary storage portion 51 of the register table 1.5 in accordance with a particular criterion and to store therein the priority order which makes a reference upon re-arrangement of information. To this end, the priority order storage section 1.8 stores the priority order of each center uniquely therein as illustrated in FIG. 9.

Due to the construction described above, when, for example, as shown in FIG. 10, a subscriber whose subscriber information (ID number 002) is registered in the mailing center 11 accesses the other mailing center (multi-media mailing apparatus) 12 in which the subscriber information is not registered (refer to (1) in FIG. 10), the following processing is executed.

Figure 10:
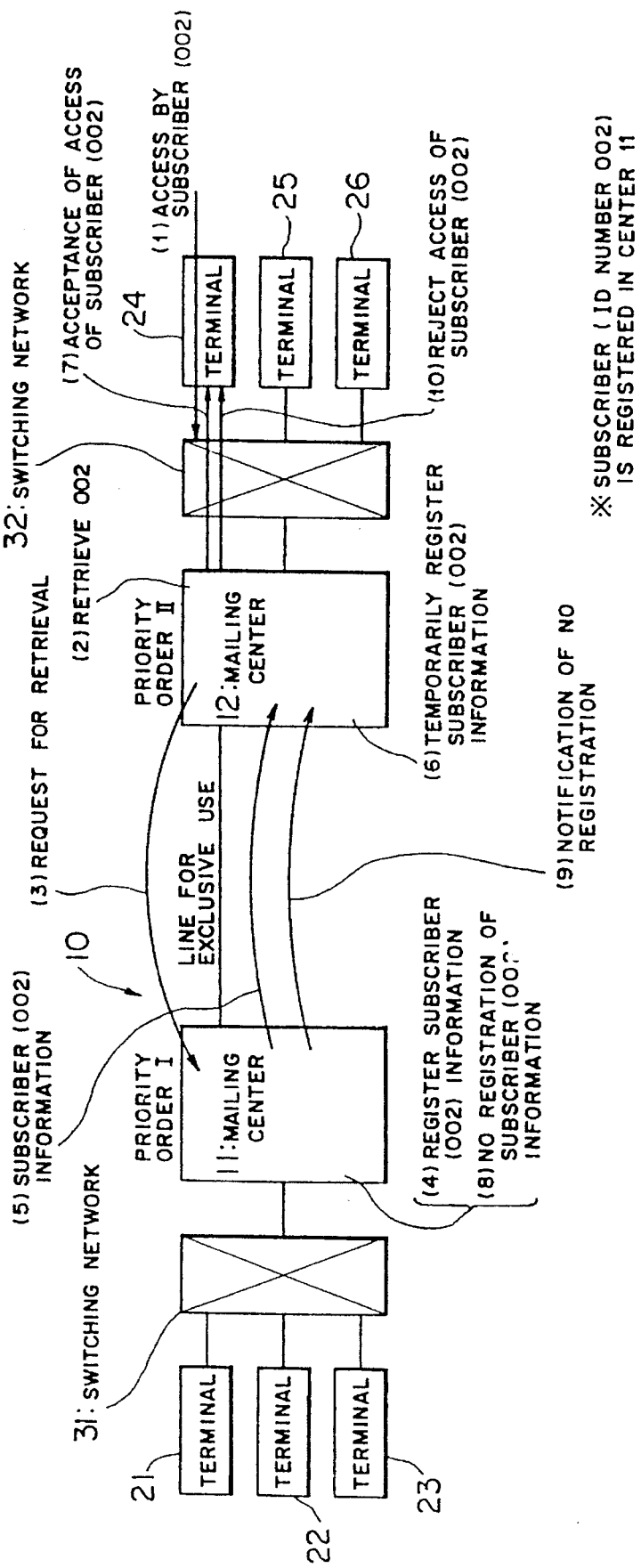
FIGS. 10 and 11 are block diagrams illustrating operation of the multi-media mailing system of FIG. 1.

In particular, the mailing center 12 retrieves the registration information of the subscriber in the subscriber information storage section 1.2 by means of the subscriber number retrieval section 1.1 (refer to (2) in FIG. 10).

Then, when the subscriber number retrieval section 1.1 of the mailing center 12 determines that the subscriber (ID number 002) is not registered in the mailing center 12, it delivers a request for retrieval of the subscriber registration information of the subscriber to all of those mailing centers in which the subscriber may possibly be registered (refer to (3) in FIG. 10). It is to be noted that, in the system shown in FIG. 100 since only the mailing center 11 is involved other than the mailing center 12, naturally the request is delivered only to the mailing center 11.

In the mailing center 11 which received the request, the subscriber number retrieval section 1.1 transmits subscriber information of the subscriber (ID number 002) registered in the subscriber information storage section 1.2 to the mailing center 12 (refer to (4) and (5) in FIG. 10).

The mailing center 12 thus receives the subscriber registration information of the subscriber (ID number 002) from the mailing center 11 and stores the information temporarily into the temporary utilizer subscriber information storage section 1.3 of the mailing center 12 (refer to (6) In FIG. 10).

Consequently, the subscriber (ID number 002) is treated as a temporary subscriber by the mailing center 12 and log-in of it is performed. As a result, acceptance of the access from the subscriber (ID number 002) is received by the mailing center 12 (refer to (7) in FIG. 10).

On the other hand, when the retrieval by the mailing center 11, which has been performed in response to the request for retrieval of the registration information of the subscriber (ID number 002) from the mailing center 12, reveals that the information is not registered in the mailing center 11 (refer to (8) in FIG. 10), the mailing center 11 transmits a notification of the result of the retrieval to the mailing center 12 (refer to (9) in FIG. 10). The mailing center 12 thus receives the notification and executes processing of rejection of log-in of the subscriber (refer to (10) in FIG. 10).

When log-in of the subscriber is permitted to realize acceptance of the access of the subscriber, such processing as illustrated in FIGS. 11 to 15 and described below is executed.

Figure 11:
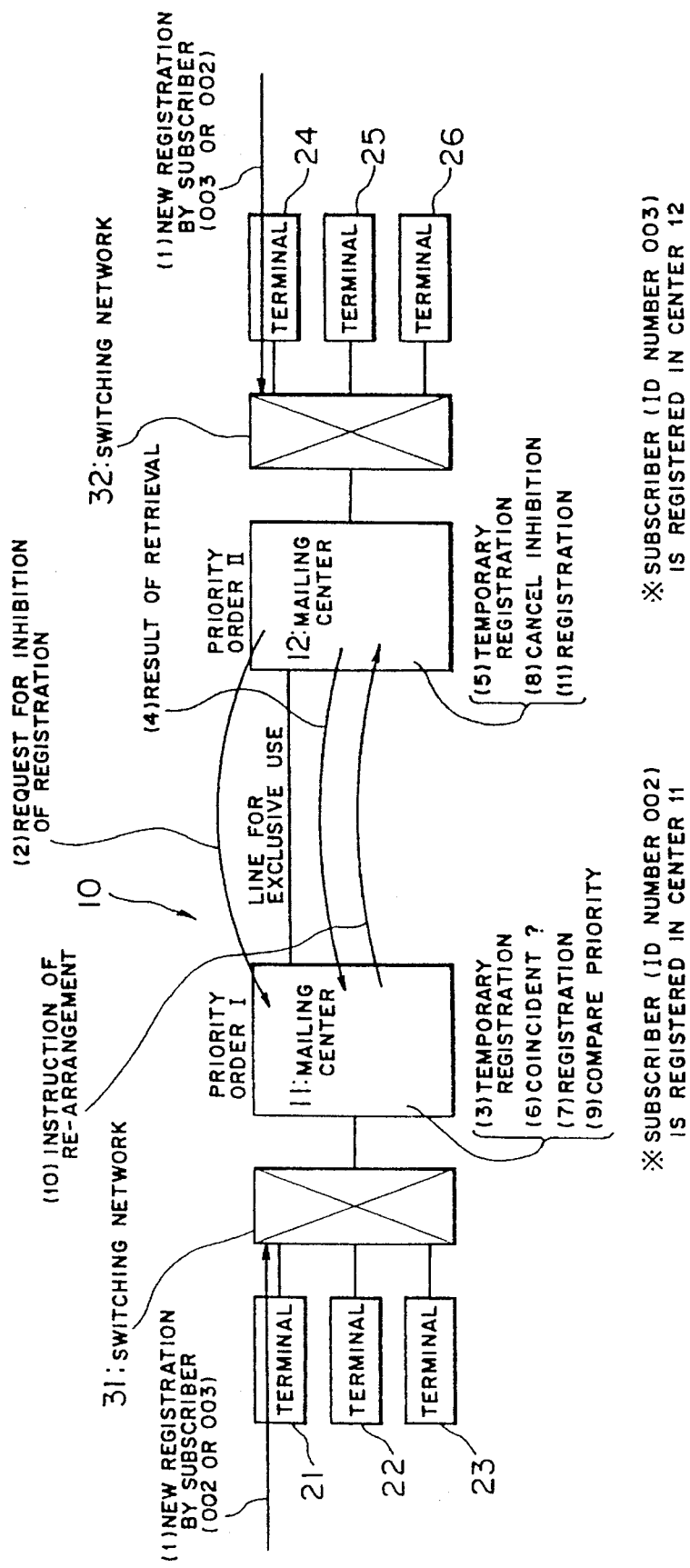
Figure 12:
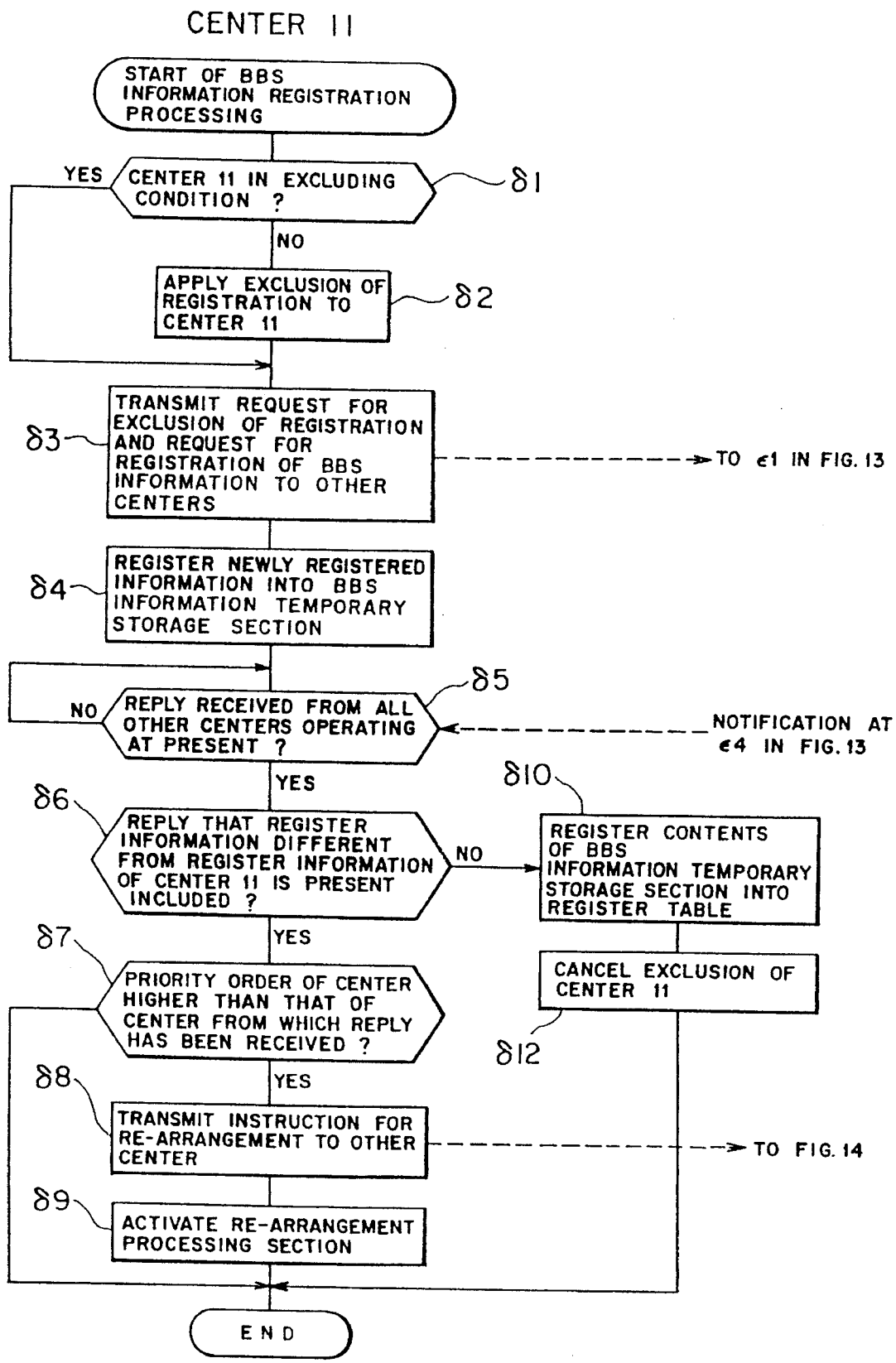
FIGS. 12, 13 and 14 are flow charts illustrating operation of the multi-media mailing system of FIG. 1.

In particular, if a request for processing of registration of particular bulletin board service information of a particular subscriber (ID number 002 or ID number 003) is provided to the mailing center 11 ((1) in FIG. 11), then if the mailing center 11 is not in its excluding condition (NO at step δ1 in FIG. 12), then it thereafter excludes a request for registration or deletion processing from the terminals belonging to the mailing center 11 (step δ2 in FIG. 12). But if the mailing center 11 is otherwise in its excluding condition (YES at step δ1 in FIG. 12), then the control sequence advances to step δ3 skipping the exclusion processing. It is to be noted, however, that, in the exclusion processing described above, a request for registration or deletion from the other mailing center 12 is permitted.

Then at step δ3 in FIG. 12, the mailing center 11 transmits the bulletin board service information indicated for registration, a request for registration of the bulletin board service information and a request for exclusion (inhibition) to the mailing center 12 (refer to (2) in FIG. 11).

After such transmission processing, the mailing center 11 registers the bulletin board service information requested newly for registration into the temporary storage portion 51 of the register table 1.5 by means of the bulletin board service section 1.4 (refer to (3) in FIG. 11 and step δ4 in FIG. 12). As a result, the newly registered information is allocated to the last term of the temporary storage portion 51 of the register table 1.5. Thereafter, the mailing center 11 performs confirmation of replies from all mailing centers which are operating at present (only the center 12 in the system shown in FIG. 11) (step δ5).

Figure 13:
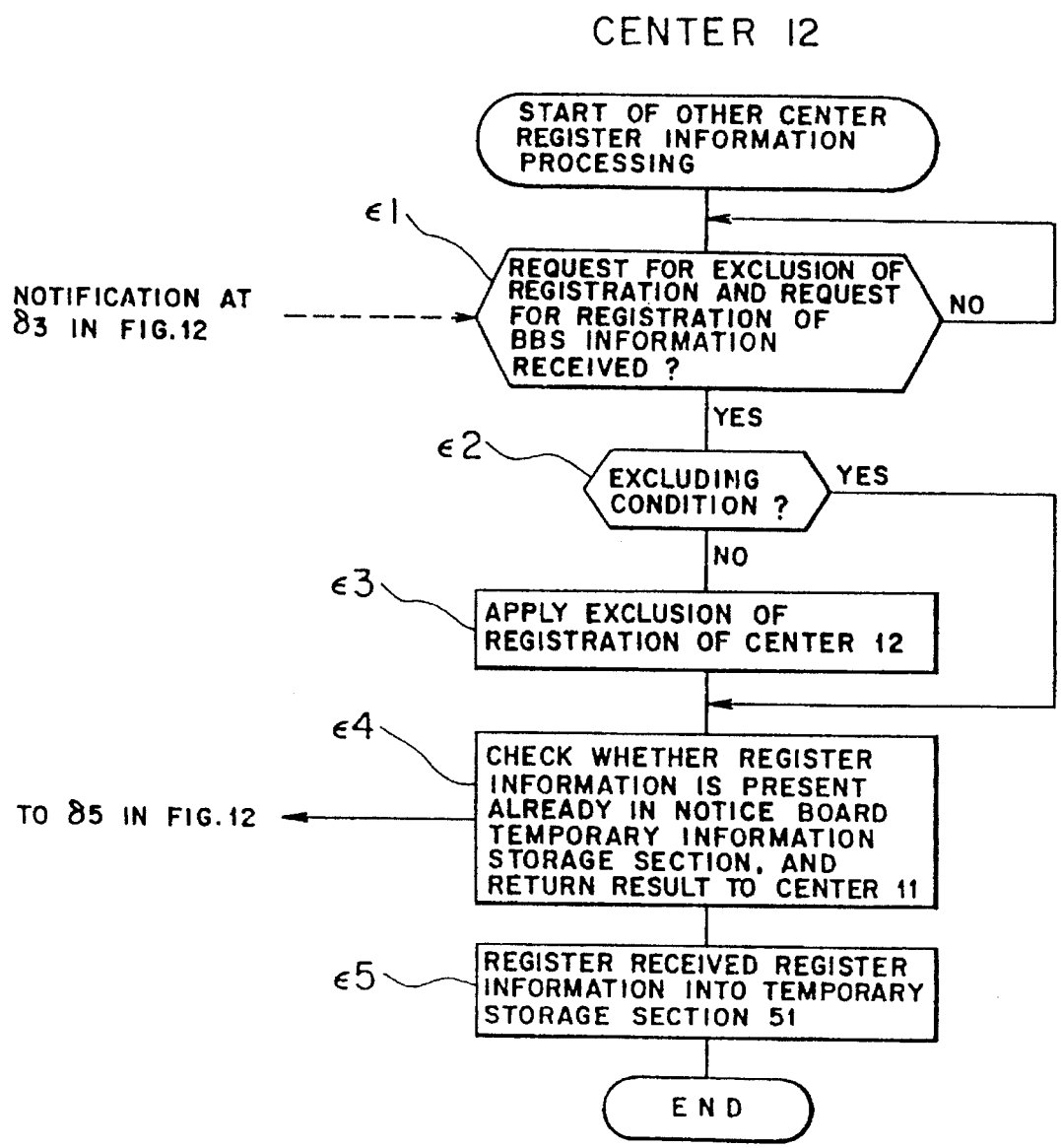

On the other hand, the mailing center 12, which has received the registration information, the request for registration and the request for exclusion from the mailing center 11 at step δ3 In FIG. 12 (refer to step ε1 in FIG. 13), thereafter excludes, if it is not in its excluding condition (NO at step ε2 in FIG. 13), a request for registration or deletion processing from any terminal belonging to the mailing center 12 (step ε3 in FIG. 13). On the contrary, if the mailing center 11 is in its excluding condition (YES at step ε2 in FIG. 13), then the control sequence advances to step ε4 in FIG. 13, skipping the exclusion processing described above.

Then at step ε4, the mailing center 12 searches by means of the bulletin board service section 1.4 to discriminate whether or not some other newly registered information is present in the temporary storage portion 51 of the register table 1.5, and transmits the result of the search to the mailing center 11 (refer to (4) in FIG. 11).

After such transmission processing, the mailing center 12 registers the registration information, which has been received precedently and requested newly for registration, into the temporary storage portion 51 of the register table 1.5 (refer to (5) in FIG. 11 and step ε5 in FIG. 13).

Figure 15A:
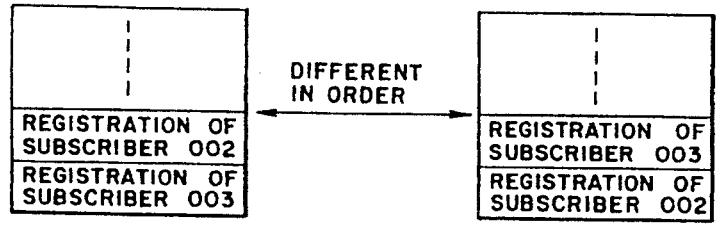
FIGS. 15(a) and 15(b) are diagrammatic views illustrating re-arrangement operation of the multi-media mailing system of FIG. 1.

On the other hand, if the mailing center 11 has successfully confirmed the replies from all of the other centers (the mailing center 12 in the present system) (YES at step δ5 in FIG. 12), then the temporary storage portion 51 of the other center 12 checks to determine whether or not the information of the replies includes registration information which is different from the registration information of the temporary storage portion 51 of the mailing center 11 (refer to (6) in FIG. 11, step δ6 in FIG. 12 and FIG. 15(a)).

If the checking reveals that such different new registration information is not present (NO at step δ6), the mailing center 11 registers the contents of the temporary storage portion 51 of the register table 1.5 as they are into the main storage portion 52 (refer to (7) in FIG. 11 and step ε10 in FIG. 12).

After such processing, the mailing center 11 cancels the inhibition of registration processing by any subscriber of the mailing center 11 itself (refer to (8) in FIG. 11 and step δ12 in FIG. 12).

On the contrary, if such different new registration information is present (YES at step δ6), the mailing center 11 compares the priority orders of the replying center 12 and the center 11 itself with each other (refer to (9) in FIG. 11 and step δ7 in FIG. 12).

If the comparison reveals that the mailing center 12 is higher in priority (NO at step δ7 in FIG. 12), then the mailing center 11 registers the contents of the temporary storage portion 51 as they are into the main storage portion 52 (refer to (7) in FIG. 11).

On the contrary, if the mailing center 12 is lower in priority (YES at step δ7 in FIG. 12), then the mailing center 11 transmits a re-arranging instruction to the mailing center 12 (refer to (10) in FIG. 11 and step δ8 in FIG. 12).

Figure 15B:
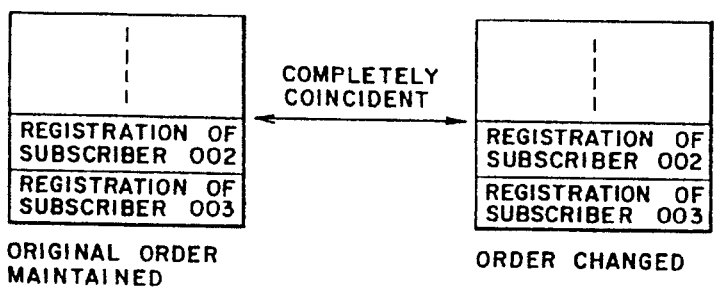

Consequently, the mailing center 11 re-arranges, by means of the bulletin board service section 1.4, the contents or registered information of the temporary storage portion 51 in accordance with a predetermined criterion, that is, in accordance with the predetermined priority order recorded in the priority order storage section 1.8 (refer to step δ9 in FIG. 12 and FIGS. 15(a) and 15(b)), and then registers the thus re-arranged information into the main storage portion 52 (refer to (7) in FIG. 11).

Figure 14:
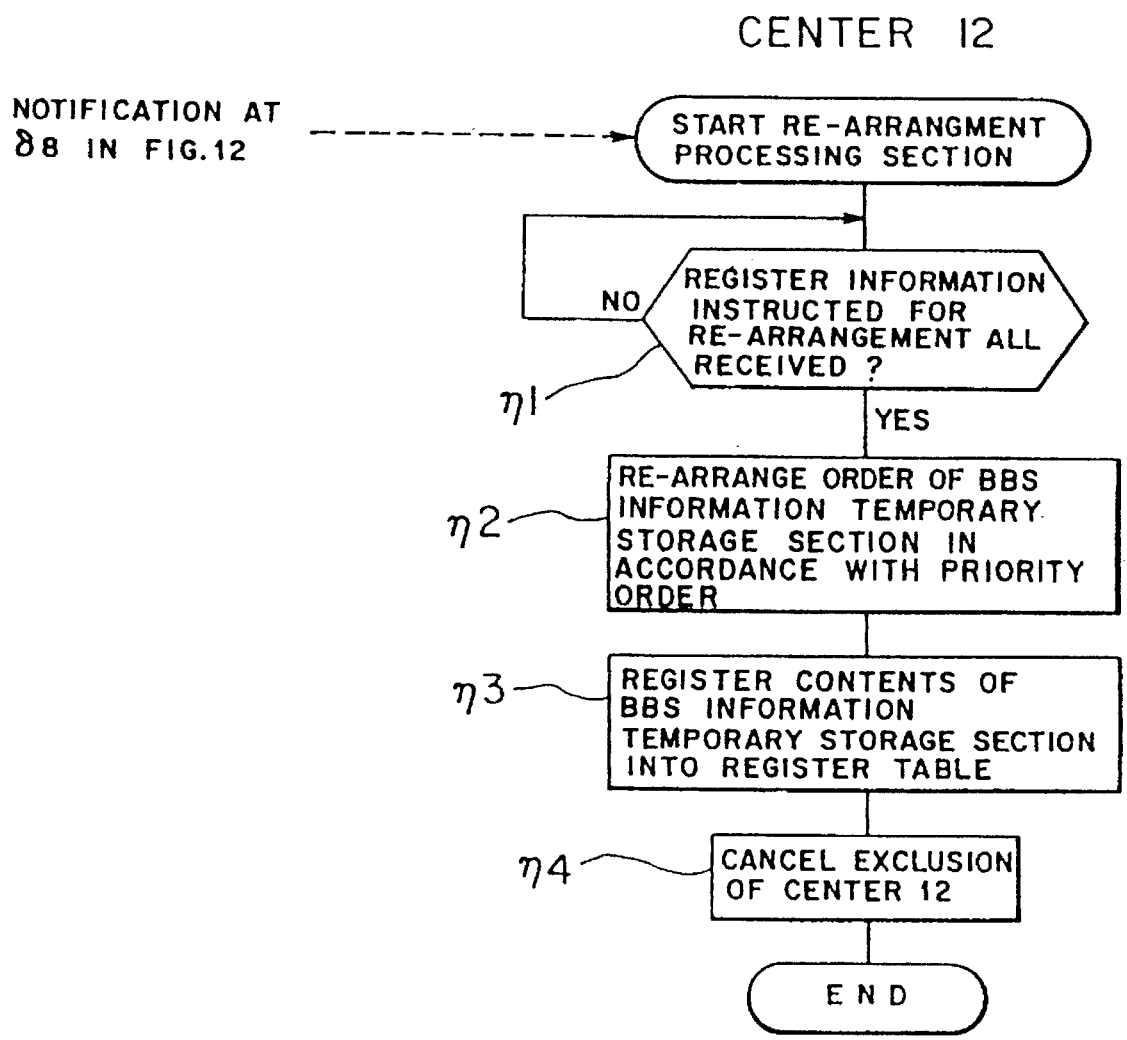

On the other hand, the mailing center 12, which has received the re-arranging instruction from the mailing center 11 at step δ8 in FIG. 12, first re-arranges, after it has received all of registration information which is an object for re-arrangement (step η1 in FIG. 14), the information in accordance with the priority order recorded in the priority order storage section 1.8 (step η2 In FIG. 14), and then registers the thus re-arranged information into the main storage portion 52 (refer to (11) in FIG. 11 and step η3 in FIG. 14). Thereafter, the mailing center 12 cancels the inhibition of registration processing by any subscriber belonging to the mailing center 12 (refer to (8) in FIG. 11 and step η4 in FIG. 14).

It is to be noted that, when the mailing center 11 or 12 registers bulletin board service information into the temporary storage portion 51 of the register table 1.5, also data of the file name of the information is registered into the bulletin board service information storage section 1.6.

Further, while the foregoing description relates to processing from the mailing center 11 to the mailing center 12, since all of the processes may proceed in parallel processing, also processing from the mailing center 12 to the mailing center 11 may exist simultaneously.

Figure 16:
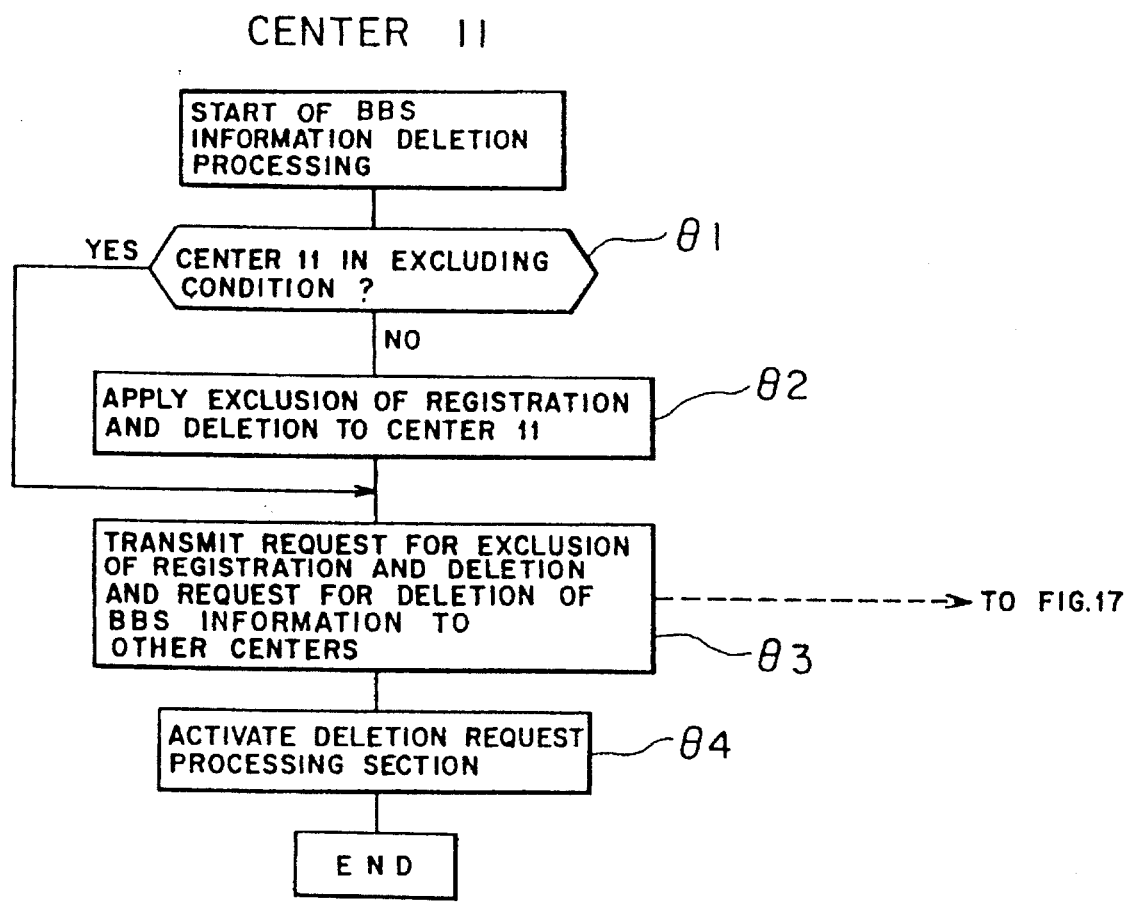
FIGS. 16 and 17 are flow charts illustrating different operation of the multi-media mailing system of FIG. 1.
Figure 17:
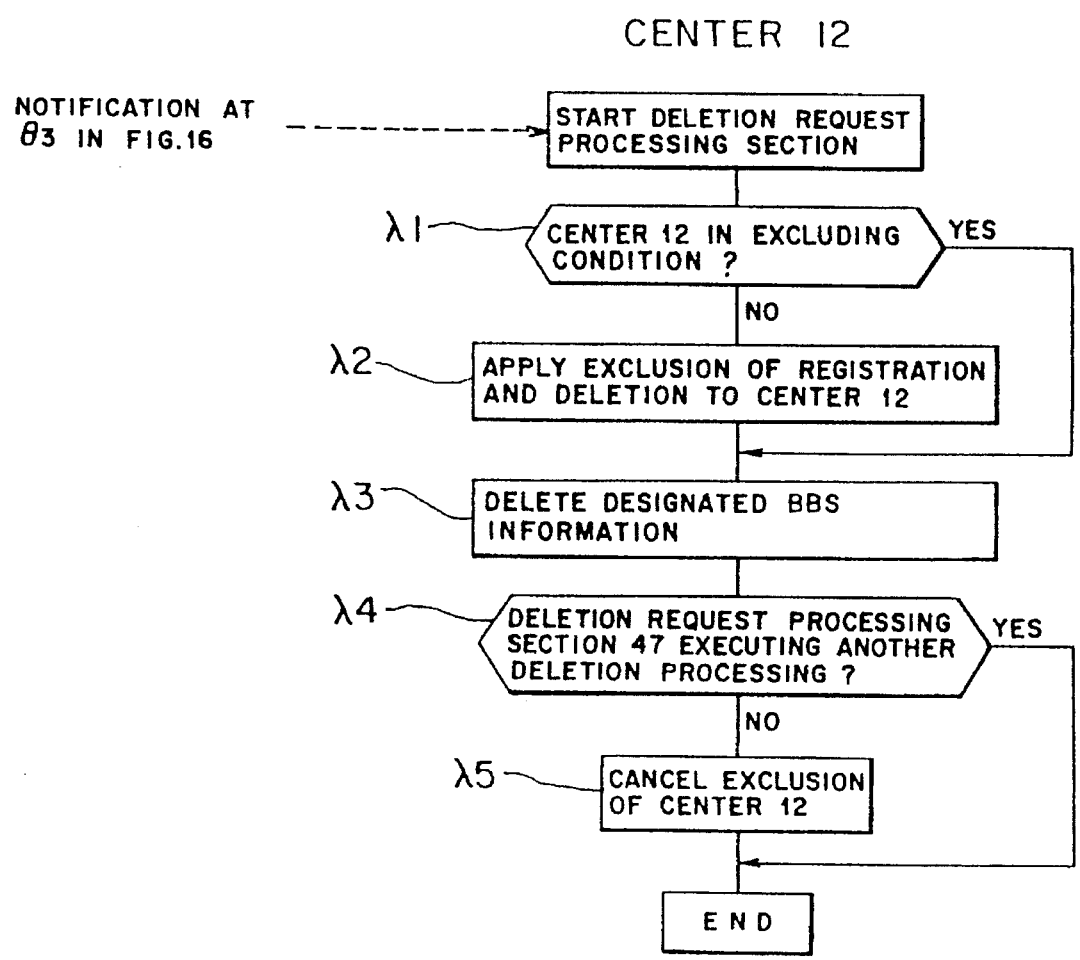
Figure 18:
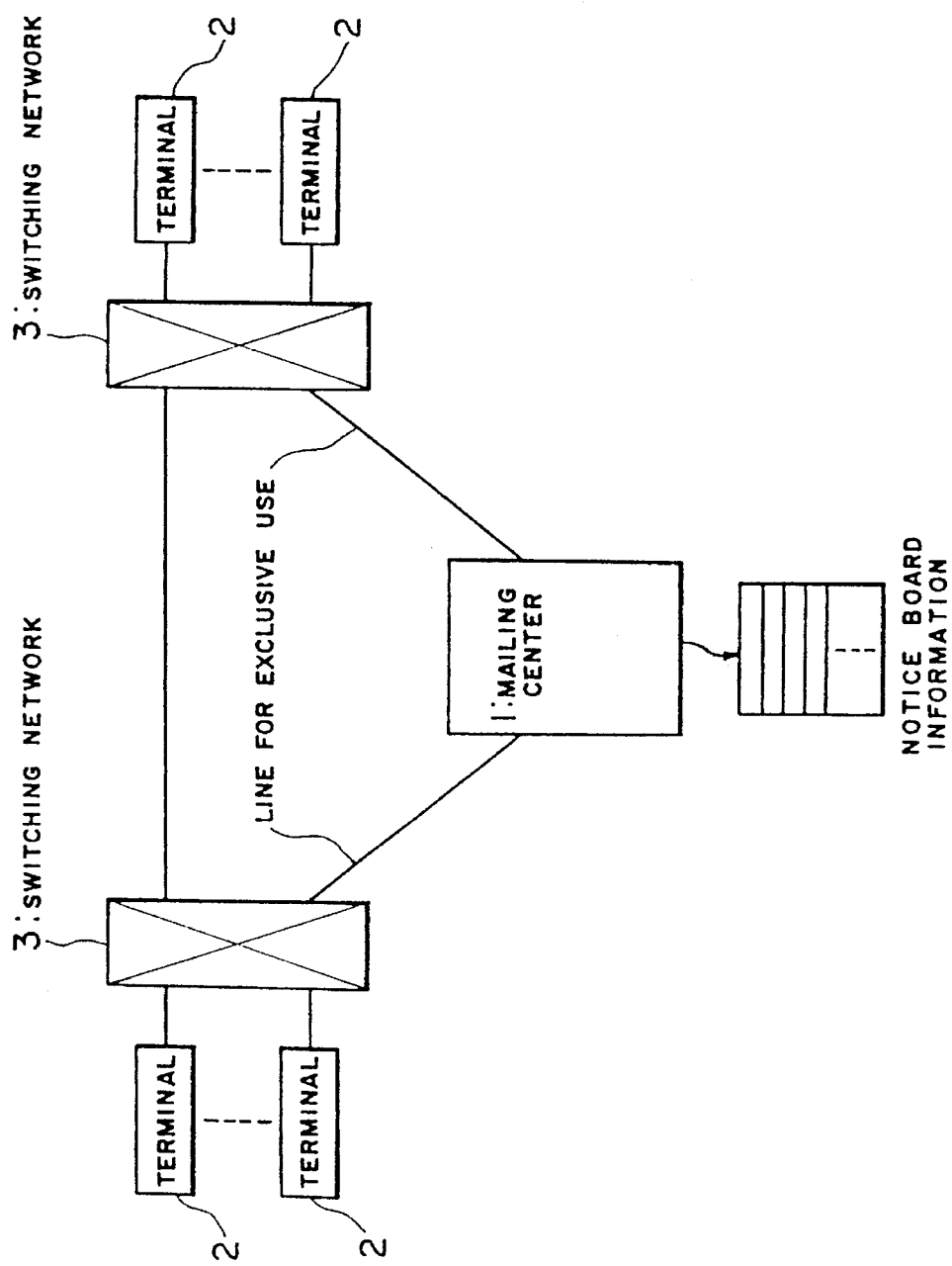
FIG. 18 is a block diagram showing a conventional multi-media mailing system.
Figure 19:
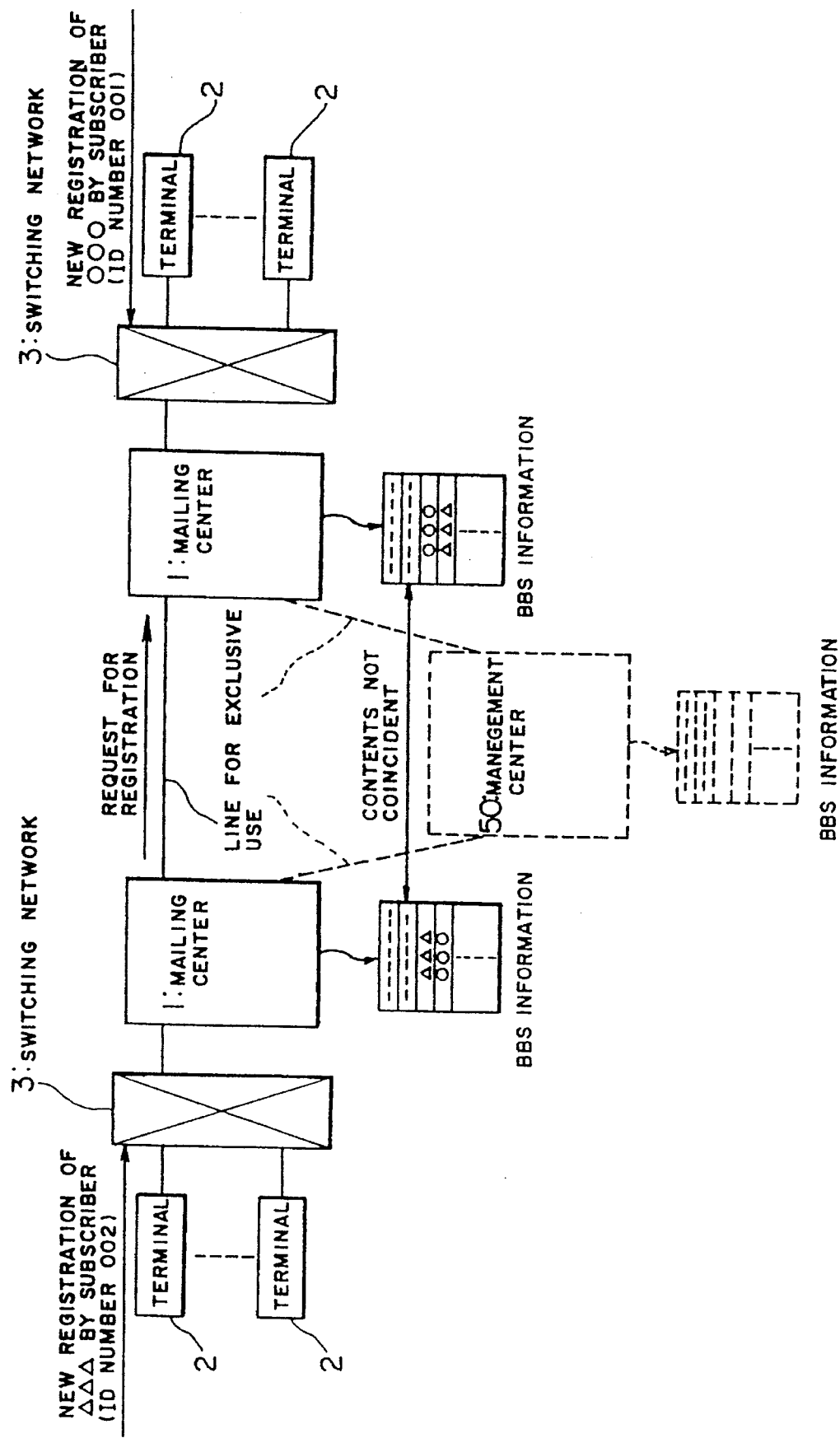
FIG. 19 is a block diagram showing another conventional multi-media mailing system.

On the other hand, when a request for deletion processing of particular bulletin board service information of a subscriber (ID number 002 or ID number 003) is accepted by the mailing center 11, the centers 11 and 12 execute such processes as illustrated in FIGS. 16 and 17, respectively.

First, the mailing center 11 inhibits registration and deletion processing by any other subscriber (refer to NO at step θ1 and also to step θ2 in FIG. 16). It is to be noted, however, that those subscribers excluded by the mailing center 11 are subscribers all belonging to the mailing center 11. Further, if an excluding condition has been entered already, then the control sequence advances to step θ3 skipping the exclusion processing (YES at step θ1 in FIG. 16).

Then, the mailing center 11 transmits bulletin board service information designated for deletion, a request for deletion processing of the information and a request for inhibition of processing by any other subscriber to the mailing center 12 (step θ3 in FIG. 16).

Thereafter, the deletion request processing section 47 of the bulletin board service section 1.4 in the mailing center 11 is rendered operative to execute deletion processing of the designated information in the register table 1.5 of the mailing center 11 (step θ4 in FIG. 16).

On the other hand, the mailing center 12, which has received the bulletin board service information designated for deletion, the request for deletion processing and the request for inhibition from the mailing center 11 at step θ3 in FIG. 16, thereafter inhibits registration and deletion processing by any other subscriber (refer to NO at step λ1 and also to step λ2 in FIG. 17). However, if an excluding condition has been entered already, then the control sequence advances directly to step λ3 skipping the exclusion processing (YES at step λ1 in FIG. 17). However, those subscribers excluded by the mailing center 12 are subscribers belonging to the mailing center 12 similarly to those of the mailing center 11.

The mailing center 12 which received the information and the requests executes, by means of the bulletin board service section 1.4, deletion processing of the designated information from the register table 1.5 of the mailing center 12 (step λ3 in FIG. 17).

Thereafter, the mailing center 12 cancels, by means of the deletion request processing section 47 of the bulletin board service section 1.4, if some other deletion processing is not being executed (NO at step λ4 in FIG. 17), its inhibiting condition of registration or deletion processing by any other subscriber (step θ5 in FIG. 16).

On the contrary, if the deletion request processing section 47 is executing some other deletion processing (YES at step λ4 in FIG. 17), then the mailing center 12 ends only the deletion processing of the subscriber without cancelling its exclusion processing of any other subscriber (YES at step θ4 in FIG. 16).

It is to be noted here that, while description of the multi-media mailing system which includes two mailing centers has been given above, the multi-media mailing system will operate or process in a similar manner also where it includes more than two mailing centers. In this manner, when a subscriber, whose subscriber information is registered in the mailing center 11, accesses the other mailing center 12 in which the subscriber information is not registered, the mailing center 12 receives and temporarily stores therein the subscriber information from the mailing center 11 and permits the access by the subscriber. Consequently, if the subscriber is registered as a subscriber in any of the centers of the system, it can access from any of the centers. In other words, from whichever one of the centers in the system the subscriber accesses, the same service can be provided to the subscriber without causing the user to pay attention to the center configuration.

Further, if a subscriber makes a request for registration or deletion processing of particular information to the mailing center 11, then the mailing center 11 executes processing of the particular information, and thereafter, the other mailing center 12 executes processing of the particular information and discriminates whether or not some other processing has been performed before the processing. Then, if the discrimination results in the affirmative, the mailing center 12 changes the contents of the register table 1.5 in accordance with a predetermined criterion, that is, re-arranges the information in accordance with a predetermined priority order, and then cancels its inhibiting condition of processing by any other subscriber. Consequently, it is possible to perform registration or deletion of bulletin board service information at an arbitrary center in the system and to automatically register or delete bulletin board service information of all of the other centers corresponding to the bulletin board service information. Consequently, all of the centers in the system can have the identical bulletin board service information to one another.

The present invention is not limited to the specifically described embodiment, and variations and modifications may be made without departing from the scope of the present invention.

What is claimed is:

1. A multi-media mailing method for a multi-media mailing system which includes a plurality of mailing centers having same information data base, in a network, for handling and transmitting information by signals including facsimile signals, audio signals and text signals, the method comprising the steps of:

when a subscriber makes a request for processing registration of bulletin board service information at a first one of said mailing centers, processing of registration of the bulletin board service information to store said information in storage means of said first mailing center, and delivering by said first mailing center a request for processing of registration of the bulletin board service information and a request to inhibit processing of registration by any other subscriber to a second one of said mailing centers other that the first mailing center, then processing of registration of the bulletin board service information into storage means of the second mailing center, and then, when some other registration processing has been performed before the processing of registration of the bulletin board service information, processing information to change contents of the storage means of the second mailing center in accordance with contents of storage means of a predetermined one of said mailing centers which is highest in priority order, and finally cancelling the inhibition of processing by any other subscriber.

2. A multi-media mailing method as claimed in claim 1, further comprising the steps of delivering by the second mailing center to the first mailing center, when some other processing of registration has been performed at a point of time when the second mailing center receives the request for processing of registration of the bulletin board service information and the request to inhibit processing by any other subscriber, a notification that another processing of registration has been performed, and then determining at the first mailing center, which receives the notification, in accordance with the priority order whether or not the stored contents in the second mailing center should be changed, and wherein, if it is determined that the stored contents should be changed, a notification of determination is delivered to the second mailing center, and the second mailing center, which receives the notification, changes the contents of said storage means thereof in accordance with the contents of said storage means of the mailing center which is highest in priority order.

3. A multi-media mailing method as claimed in claim 1, further comprising the steps of delivering by the second mailing center to the first mailing center, when some other processing of registration has been performed at a point of time when the second mailing center receives the request for processing of registration of the bulletin board service information and the request to inhibit processing by any other subscriber, a notification that another processing of registration has been performed, and determining at the first mailing center, which receives the notification, in accordance with the priority order whether or not the stored contents in the second mailing center should be changed, wherein, if it is determined that the stored contents should be changed, a notification of determination is delivered to the second mailing center and then the first mailing center changes the contents of the storage means thereof in accordance with the contents of said storage means of the mailing center which is highest in priority order, and then the second mailing center, which receives the notification to change, changes the contents of the storage means thereof in accordance with the contents of said storage means of the mailing center which is highest in priority order.

4. A multi-media mailing apparatus which constitutes a mailing center of a multi-media mailing system having a plurality of mailing centers having same information data base, the apparatus comprising:

storage means for storing information therein;

registration processing means for receiving a request for registration of bulletin board service information by a subscriber and processing registration of the bulletin board service information to store the bulletin board service information in said storage means;

communication means for transmitting, upon reception of a request for registration of bulletin board service information by a subscriber, a request for processing of registration of the bulletin board service information and a request for inhibition of processing by any other subscriber to a second mailing center of said plurality for storing registration in storage means thereof, said communication means receiving from the second mailing center a notification that another processing of registration has been already performed;

determination means, coupled to said communication means, for determining, when a notification that another processing of registration has been already performed is received from the second mailing center by said communication means, whether or not stored contents of said storage means in the second mailing center should be changed in accordance with contents of storage means of a predetermined one of said mailing centers, which is highest in priority order; and notification changing means for producing, when it is determined by said determination means that the stored contents should be changed, a notification of the determination to be transmitted to the second mailing center by said communication means.

5. A multi-media mailing apparatus as claimed in claim 4, wherein the mailing center further comprises changing means for changing, when said determination means determines that the stored contents of the storage means of the second mailing center should be changed, the stored contents of said storage means of the second mailing center in accordance with contents of said storage means of the mailing center which is highest in priority order.

6. A multi-media mailing apparatus as claimed in claim 5, wherein said storage means of each mailing center includes temporary storage means for temporarily storing the bulletin board service information therein and for changing stored contents thereof under the control of said changing means, and main storage means for storing therein the stored contents of said temporary storage means transferred thereto from said temporary storage means.

7. A multi-media mailing apparatus as claimed in claim 5, further comprising priority order information storage means for storing therein priority order information for use when the contents of said storage means of the second mailing center are to be changed in accordance with the contents of said storage means of the mailing center which is highest in priority order.

8. A multi-media mailing apparatus which constitutes a mailing center of a multi-media mailing system including a plurality of mailing centers having same information data base, the apparatus comprising:

storage means for storing bulletin board service information therein;

processing/inhibition request reception means for receiving a request for processing of registration of the bulletin board service information and a request for inhibition of processing by any other subscriber from a second mailing center of said plurality of mailing centers;

processing means for processing, upon reception of the request for processing and the request for inhibition by said processing/inhibition request reception means from said second mailing center, registration of the bulletin board service information into said storage means;

determination means for determining whether or not another processing of registration has been performed upon notification from the second mailing center before the processing by said processing means;

changing means for changing, when said determination means determines that another processing of registration has been performed before the processing by said processing means, the contents of said storage means in accordance with contents of storage means of a predetermined one of said mailing centers which is highest in priority order; and inhibition cancellation means for canceling the inhibition of processing by any other subscriber after the processing by said processing means or the changing of said contents by said changing means is completed.

9. A multi-media mailing apparatus as claimed in claim 8, wherein said changing means includes communication means for transmitting, when said determination means determines that another processing of registration of information has been performed before the processing by said processing means, a determination to the second mailing center and for receiving a stored contents changing instruction from the second mailing center, and varying means for varying, when a stored contents changing instruction is received from the second mailing center by said communication means, the stored contents of said storage means in accordance with the contents of said storage means of the mailing center which is highest in priority order.

10. A multi-media mailing apparatus as claimed in claim 8, wherein said storage means includes temporary storage means for temporarily storing the bulletin board service information therein and for changing stored contents thereof under the control of said changing means, and main storage means for storing therein the stored contents of said temporary storage means transferred thereto from said temporary storage means.

11. A multi-media mailing apparatus as claimed in claim 8, further comprising priority order information storage means for storing therein priority order information for use when the contents of said storage means are to be changed in accordance with the contents of said storage means of the mailing center which is highest in priority order.

* * * * *